(12) United States Patent
Waite et al.

(10) Patent No.: US 12,492,153 B2
(45) Date of Patent: Dec. 9, 2025

(54) PRODUCTS PREPARED FROM WASTE GAS STREAMS CONTAINING $H_2S$, $SO_2$, AND/OR $NH_3$

(71) Applicant: Tessenderlo Group NV, Brussels (BE)

(72) Inventors: Scott Waite, Tonopah, NV (US); Harry Charles Kominski, Phoenix, AZ (US); Rajendra Ghimire, Katy, TX (US); Jeroen van Cauwenbergh, Brussels (BE)

(73) Assignee: Tessenderlo Group NV, Brussels (BE)

( * ) Notice: Subject to any disclaimer, the term of this patent is extended or adjusted under 35 U.S.C. 154(b) by 1013 days.

(21) Appl. No.: 17/623,659

(22) PCT Filed: Jul. 6, 2020

(86) PCT No.: PCT/US2020/040887
§ 371 (c)(1),
(2) Date: Dec. 29, 2021

(87) PCT Pub. No.: WO2021/003479
PCT Pub. Date: Jan. 7, 2021

(65) Prior Publication Data
US 2022/0259112 A1   Aug. 18, 2022

Related U.S. Application Data

(60) Provisional application No. 62/870,306, filed on Jul. 3, 2019.

(51) Int. Cl.
*C05C 3/00* (2006.01)
*C05D 1/00* (2006.01)
(Continued)

(52) U.S. Cl.
CPC .............. *C05C 3/005* (2013.01); *C05D 1/005* (2013.01); *C05D 1/02* (2013.01); *C05D 5/00* (2013.01); *C05D 9/00* (2013.01); *C05G 1/00* (2013.01)

(58) Field of Classification Search
CPC . C05D 1/005; C05D 1/02; C05D 5/00; C05D 9/00; C05D 9/02; C05G 1/00; C05B 17/00; Y02P 60/21
See application file for complete search history.

(56) References Cited

U.S. PATENT DOCUMENTS

2011/0070144 A1* 3/2011 Hojjatie .................... C01C 1/24
423/388

FOREIGN PATENT DOCUMENTS

EP       0361998 A1    4/1990
WO    03/002455 A1    1/2003
(Continued)

*Primary Examiner* — Daniel C. Mccracken
*Assistant Examiner* — Jaanzeb C Raja
(74) *Attorney, Agent, or Firm* — Ipsilon USA—NLO

(57) ABSTRACT

An aqueous composition comprises at least one oxidizable sulfur-based compound. A concentrated extract of the aqueous composition includes a gas chromatography/mass spectrometry-detectable amount of contaminating refinery hydrocarbons but the aqueous composition is free of refinery odor when stored for at least 24 hours at room temperature and 60% relative humidity. The aqueous compositions are prepared from a gas stream obtained from a petroleum refinery process, a coke oven, or the like, containing at least about 4 mol %, more specifically about 15 mol %, of hydrogen sulfide ($H_2S$) and/or sulfur dioxide ($SO_2$) and/or ammonia ($NH_3$), and at least about 0.1 mol % of contaminating refinery hydrocarbons. The aqueous compositions are suitable for use in fertilizers, mining and industrial applications.

7 Claims, 7 Drawing Sheets

(51) Int. Cl.
*C05D 1/02* (2006.01)
*C05D 5/00* (2006.01)
*C05D 9/00* (2006.01)
*C05G 1/00* (2006.01)

(56) References Cited

FOREIGN PATENT DOCUMENTS

| WO | WO-2008016401 A1 * | 2/2008 | ............. B01D 53/58 |
| WO | 2012/142704 A1 | 10/2012 | |
| WO | WO-2017116773 A1 * | 7/2017 | ......... B01D 53/1481 |

* cited by examiner

PRODUCTS PREPARED FROM WASTE GAS STREAMS CONTAINING $H_2S$, $SO_2$, AND/OR $NH_3$

FIELD OF THE INVENTION

This invention relates to aqueous compositions, including agriculture products, more particularly, plant fertilizers, and to other liquid and solid products that are prepared from industrial gases containing $H_2S$, $SO_2$, and/or $NH_3$ and a certain amount of contaminating organic molecules that traditionally produce a distinctive and unpleasant organic odor, referred to as a refinery odor, and/or discoloration in the industrial gases and/or products produced from such gases. The compositions of the present invention are free of undesirable refinery odor and discoloration which traditionally accompany products produced from such industrial gases.

BACKGROUND OF THE INVENTION

Mineral fertilizers are a cornerstone of modern-day agriculture. Without such fertilizers, worldwide production of all crops would be greatly reduced, placing significant stress on food supply systems. Fertilizers come in two basic forms, liquid and dry. In the United States, over the last 50 years, liquid fertilizers have gained in popularity mainly due to the ease of handling and application.

Generally, for a liquid fertilizer to be a commercially viable product, it must have a fairly high nutrient content and it must be blendable with other liquid fertilizers to supply the required nutrients for a growing crop.

Urea ammonium nitrate (UAN) is a popular liquid fertilizer containing about 28-32 wt % nitrogen. Ammonium polyphosphate (APP), another commonly used liquid fertilizer, contains from about 34-47 wt % phosphate.

Sulfur (S) has emerged as a major nutrient for plants. It is considered the fourth major plant nutrient, after nitrogen (N), phosphorous (P) and potassium (K), due to the amount of sulfur required by plants. Sulfur is essential as a structural component of some amino acids found in both plants and animals, and is a part of the makeup of every living organism. Chlorophyll formation is also dependent on proper sulfur uptake.

About 10 million metric tons of sulfur-containing fertilizers are currently applied annually worldwide and even greater amounts are anticipated for use in the future. For example, applications of sulfur-containing fertilizers are expected to increase due to the reduction in industrial sulfur dioxide emissions and the subsequent depletion of sulfur in the soil. In recent history, industrial sulfur dioxide ($SO_2$) emissions, which were captured and transported by rainfall, have been a significant source of sulfur for crop production, but environmental restrictions that reduced airborne $SO_2$ levels since the 1980's have left a need for greater sulfur-containing fertilizer application. Additionally, soil sulfur levels have become depleted by prolonged crop removal, sulfate leaching, low precipitation deposition, and declining soil organic matter, also contributing to the need for greater sulfur-containing fertilizer application.

Although sulfur exists in many different chemical forms, sulfate anion ($SO_4^{-2}$) is the only form of sulfur that plants can absorb through their root systems. Small amounts of sulfur dioxide gas can be absorbed through a plant's leaves, but the amount is too small to satisfy the plant's need. There are two types of available sulfur-containing fertilizers for crop application. The first type includes those fertilizers that are in the form of a sulfate and ready for the plant's uptake. Examples of sulfate fertilizers are ammonium sulfate, potassium sulfate (sulfate of potash), and single superphosphate (SSP). These fertilizers may contain nitrogen (N), phosphorous (P), or potassium (K) as well, but they also are important due to the sulfur content. Sulfate fertilizers represent about 75% of the sulfur fertilizers applied annually.

The second type of sulfur-containing fertilizers are those materials containing sulfur in oxidation states other than sulfate anion. The sulfur in such fertilizers needs to go through a chemical oxidation reaction to form the sulfate anion which can be taken up by plants. Thiosulfate ($S_2O_3^{-2}$) and elemental sulfur (S) are examples of the second type of sulfur-containing fertilizers. These forms of sulfur undergo chemical oxidation in the environment to convert the sulfur to sulfate anion.

Sulfur can also exist as sulfite anion ($SO_3^{-2}$) or as bisulfite anion ($HSO_3^{-1}$). Potassium sulfite and potassium bisulfite are examples of sulfur in the sulfite and bisulfite form. Potassium sulfite has been used as an anti-browning agent, an antioxidant and as a preservative. For example, it is used in wine, beer, and fruit juice preservation and in fresh fruit and meat preservation. The preservative potassium sulfite is used as an E225 preservative (a food additive for use in the European Union). Both potassium bisulfite and potassium sulfite are also used as photographic chemicals in film development and as fertilizers, particularly as starter fertilizers, for example, in planting.

It is known in the art that sulfur-containing fertilizers can be produced from waste gases. For example, sulfur-based salts such as sulfates, sulfites, bisulfites, and sulfides are produced from waste gases generated in refinery processes such as petroleum refinery processes and in coke ovens. For example, industrial chemical processing plants including petroleum refineries produce spent acid waste such as spent sulfuric acid gases. Alkylation units react olefins with an iso-paraffin in the presence of an acid catalyst such as HF or $H_2SO_4$, and a large amount of spent sulfuric acid is formed during this alkylation reaction. This generally consists of 50-85% acid and a number of chemical contaminants, usually aromatic hydrocarbons, which are processed to provide sulfur dioxide ($SO_2$)-rich gas streams.

Chemical processing plants such as petroleum refineries and natural gas processing plants also produce gases containing hydrogen sulfide and/or ammonia. In petroleum refineries, ammonia and hydrogen sulfide are produced as the result of hydrogen processing to remove nitrogen and sulfur from crude oil and repeated wash processes with water to form sour water (water containing hydrogen sulfide). This sour water is subjected to water vapor action to remove ammonia and hydrogen sulfide and produces a "sour water stripper gas" or "SWSG". The SWSG usually contains about ⅓ ammonia ($NH_3$), about ⅓ hydrogen sulfide ($H_2S$), and about ⅓ water vapor on a volumetric or molar basis. The SWSG stream also contains some carbon dioxide ($CO_2$) and refinery hydrocarbons (HC). Other refinery processes produce "acid gas" or "AG", a refinery off gas rich in $H_2S$ but also containing amounts of refinery hydrocarbons. Gases containing hydrogen sulfide or both hydrogen sulfide and carbon dioxide are generally known as "sour gases" in the hydrocarbon processing industries.

Industries with coke ovens also produce waste streams containing hydrogen sulfide ($H_2S$) and ammonia ($NH_3$), known as raw coke oven gas. In order to make this gas suitable for use as fuel gas for a coke oven battery, hydrogen sulfide and ammonia are removed from the gas. Coke oven off gas, rich in $H_2S$ and $NH_3$, is also known to contain hydrocarbons as well. Gasifiers which produce synthetic fuel gas and/or ammonia from coal or coke sources also produce an $H_2S$ off gas with trace ammonia and contaminants. Flue gases from power generation plants also contain $SO_2$ streams with contaminants that adversely affect color and odor.

Plant fertilizers like thiosulfates can be produced from the above-mentioned gas streams such as sour gases containing hydrogen sulfide and/or ammonia. In addition, the described off gases rich in sulfur dioxide ($SO_2$) and/or ammonia ($NH_3$) can also be utilized for making of sulfur-containing plant fertilizers.

However, these off gases rich in $H_2S$, $SO_2$ and/or $NH_3$ contain a certain amount of organic compounds, more particularly hydrocarbon contaminants, that typically produce a strong and unpleasant "refinery odor" or "refinery hydrocarbon odor", reminiscent of odors in refinery processing, in both the gas streams and in products produced from the gas streams, such as in aqueous compositions of sulfur-based compounds which are produced from the off gases. The aqueous compositions also typically have a brownish color from the contaminants. In general, farmers do not like the odor or color of such aqueous compositions for fertilizer use, and instead prefer odorless, transparent and colorless fertilizer products. Accordingly, it would be desirable to be able to produce such aqueous compositions of sulfur-based compounds for use in fertilizers from the noted waste gas streams while eliminating the refinery odor and providing a transparent and colorless product.

Attempts have been made in the past to remove the undesirable refinery odor by passing liquid fertilizers prepared from refinery waste streams through an activated carbon filter. This however only provided a temporary solution as even when the odor was removed upon filtering a liquid fertilizer composition through the activated carbon filter, the odor would return to the filtered compositions, generally in less than a few hours.

Another attempt to remove undesired odor and/or color involved stripping compositions with air or nitrogen. See, for example, U.S. Pat. No. 7,897,133. The stripping process works with fully oxidized products like sulfates and works in part also for sulfites/bisulfites. However, stripping compositions of thiosulfates with air oxidizes the thiosulfates to sulfates. Also, an additional treatment is needed to remove the brownish color by either spray drying or by contact with an activated carbon.

There has been a demand for a simple and efficient solution to remove undesirable refinery odor and/or color in sulfur-based salts (SBS) and other sulfur-containing compounds prepared from waste streams that not only contain hydrogen sulfide and/or sulfur dioxide, but also contain a certain amount of refinery hydrocarbon contaminants which impart a lasting refinery odor and brown color to aqueous compositions of such compounds. It would be particularly desirable to more permanently remove the refinery odor without the risk of the odor returning after a certain period of time, and to provide odor-free and colorless products via one single treatment.

SUMMARY OF THE INVENTION

Against this background, it is an object to provide improved products which overcome one or more disadvantages of the prior art.

In one embodiment, the invention is directed to aqueous compositions comprising at least one sulfur-based compound that is prepared from a gas stream contaminated with refinery hydrocarbons, such as a gas stream obtained from a petroleum refinery process or a coke oven, containing at least about 4 mol %, preferably at least about 15 mol %, of hydrogen sulfide ($H_2S$) and/or sulfur dioxide ($SO_2$) and/or ammonia ($NH_3$), and containing at least about 0.1 mol % of contaminating refinery hydrocarbons. An extracted concentrate of the aqueous composition of the invention typically includes a detectable amount of residual contaminating refinery hydrocarbons when analyzed by gas chromatography/mass spectrometry; but the total amount of refinery hydrocarbons in the aqueous composition itself is below the olfactive detection limit after at least 24 hours of storage at room temperature and 60% relative humidity.

In another embodiment, the invention is directed to aqueous compositions comprising at least one oxidizable sulfur-based compound prepared from a gas stream such as a gas stream obtained from a petroleum refinery process or a coke oven and containing at least about 4 mol %, more specifically at least about 15 mol % of hydrogen sulfide ($H_2S$) and/or sulfur dioxide ($SO_2$) and/or ammonia ($NH_3$), and at least about 0.1 mol % of contaminating refinery hydrocarbons. A concentrated methylene chloride extract of 200 ml of the aqueous composition includes a gas chromatography/mass spectrometry-detectable amount of at least 1 ppm of contaminating refinery hydrocarbons comprising one or more sulfur-containing, saturated heterocyclic or acyclic compounds having a boiling point of at least about 150° C., evidencing the aqueous composition is obtained from a petroleum refinery process or a coke oven. However, surprisingly, the aqueous composition is free of refinery odor when stored for at least 24 hours at room temperature and 60% relative humidity.

In another embodiment, the invention is directed to an aqueous composition comprising at least one oxidizable sulfur-based compound that is prepared from a gas stream, wherein the gas stream is obtained from a petroleum refinery process or a coke oven and contains at least about 4 mol %, more specifically, at least about 15 mol % of hydrogen sulfide ($H_2S$) and/or sulfur dioxide ($SO_2$) and/or ammonia ($NH_3$), and at least about 0.1 mol % of contaminating refinery hydrocarbons, and wherein the aqueous composition has been contacted with a sorbent material, wherein an extracted concentrate of the aqueous composition includes a detectable amount of contaminating refinery hydrocarbons when analyzed by gas chromatography/mass spectrometry, and wherein the total amount of refinery hydrocarbons in the aqueous composition is at least 40 mol % less than in a comparable aqueous composition that has not been contacted with the sorbent material.

In another embodiment, the invention is directed to an aqueous composition comprising at least one thiosulfate prepared from a gas stream, wherein the gas stream is obtained from a petroleum refinery process or a coke oven and contains at least about 4 mol %, more specifically, at least about 15 mol % of hydrogen sulfide ($H_2S$), sulfur dioxide ($SO_2$) and/or ammonia ($NH_3$), and at least about 0.1 mol % of contaminating refinery hydrocarbons, wherein the composition has been passed through an activated carbon filter, wherein an extracted concentrate of the composition includes a detectable amount of residual contaminating refinery hydrocarbons when analyzed by gas chromatography/mass spectrometry, but wherein the total amount of refinery hydrocarbons in said aqueous composition is at least 40 mol % less than in a comparable composition that has not been passed through the activated carbon filter. In a specific embodiment, the sorbent used for deodorization and/or decolorizing comprises granular activated carbon, optionally also with glass fibers having a diameter ranging from about 0.001 to about 0.1 mm.

In yet another embodiment, the invention is directed to a liquid fertilizer for use in an agricultural application, comprising an aqueous composition according to the invention, and at least one nitrogen-, phosphorus- or potassium-containing fertilizer compound (NPK fertilizer compound) different from the sulfur-based salt in the aqueous composition.

In another embodiment, the invention is directed to a liquid mining or industrial composition, comprising an aqueous composition according to the invention, and at least one nitrogen-, sodium, calcium- or potassium-containing compound different from the at least one oxidizable sulfur-based compound.

In another embodiment, the invention is directed to a solid or crystalline material prepared by drying an aqueous composition of the invention, a liquid fertilizer of the invention, or a liquid mining or industrial composition of the invention.

In another embodiment, the invention is directed to processes of preparing such compositions, fertilizers and solid or crystalline materials. In a specific embodiment, a process for preparing the aqueous compositions of the invention comprises reacting a gas stream obtained from a petroleum refinery process or a coke oven and containing at least about 4 mol %, more specifically, at least about 15 mol % of hydrogen sulfide ($H_2S$) and/or sulfur dioxide ($SO_2$) and/or ammonia ($NH_3$), and at least about 0.1 mol % of contaminating refinery hydrocarbons to form the at least one oxidizable sulfur-based compound in an aqueous medium, and contacting the aqueous medium containing the at least one oxidizable sulfur-based compound with a sorbent material to provide the aqueous composition. The sorbent material comprises (a) a macroporous hydrophobic nonfunctionalized resin having a BET surface area ranging from about 500 to about 1500 $m^2/g$ and a total porosity of greater than about 0.9 ml/g, or (b) granular activated carbon and optionally glass fibers having a diameter ranging from about 0.001 to about 0.1 mm. The total amount of refinery hydrocarbons in the aqueous composition is at least about 40 mol % less than in the aqueous medium prior to the contacting step.

In a particular embodiment of the invention, the sorbent material (a) is a macroporous hydrophobic nonfunctionalized resin selected from a crosslinked vinyl resin, specifically, a crosslinked polystyrene resin, acrylic resin and/or methacrylic resin, (b) is granular activated carbon, optionally with glass fibers having a diameter ranging from about 0.001 to about 0.1 mm, (c) comprises spherical particles with a crush strength greater than about 400 g/particle, and/or (d) is stable in organic solvents, strong bases and strong acids.

Throughout the invention, in all of the described composition and process embodiments, the at least one sulfur-based compound preferably is an oxidizable sulfur-based compound. More specifically, the sulfur-based compound is a sulfur-based salt, and most particularly, an oxidizable sulfur-based salt. For examples see below. Particularly preferred herein are thiosulfates and/or sulfides and/or hydrosulfides.

Gas streams obtained from a petroleum refinery process or a coke oven typically contain at least about 4, 5, 6, 7, 8, 9 or 10 mol % of hydrogen sulfide ($H_2S$) and/or sulfur dioxide ($SO_2$) and/or ammonia ($NH_3$), this for more dilutes gas streams. More regular gas streams from a petroleum refinery process or a coke oven typically contain at least about 15 mol % of hydrogen sulfide ($H_2S$) and/or sulfur dioxide ($SO_2$) and/or ammonia ($NH_3$). Most common are gas streams that contain hydrogen sulfide ($H_2S$) and/or sulfur dioxide ($SO_2$), more in particular gas streams that contain at least 15 mol % of hydrogen sulfide ($H_2S$) and/or sulfur dioxide ($SO_2$).

The compositions and products of the invention, prepared from industrial gas streams containing contaminating refinery hydrocarbons, are advantageous in being refinery odor free. In specific embodiments, the compositions remain odor-free for extended periods of time. In further embodiments, the compositions are transparent and colorless. These and additional advantages and aspects of the invention will be more apparent in view of the detailed description.

BRIEF DESCRIPTION OF THE DRAWINGS

The present invention will now be described in more detail with reference to specific embodiments of the invention, given only by way of illustration, and with reference to the accompanying drawings, in which.

DETAILED DESCRIPTION

Figure 1:
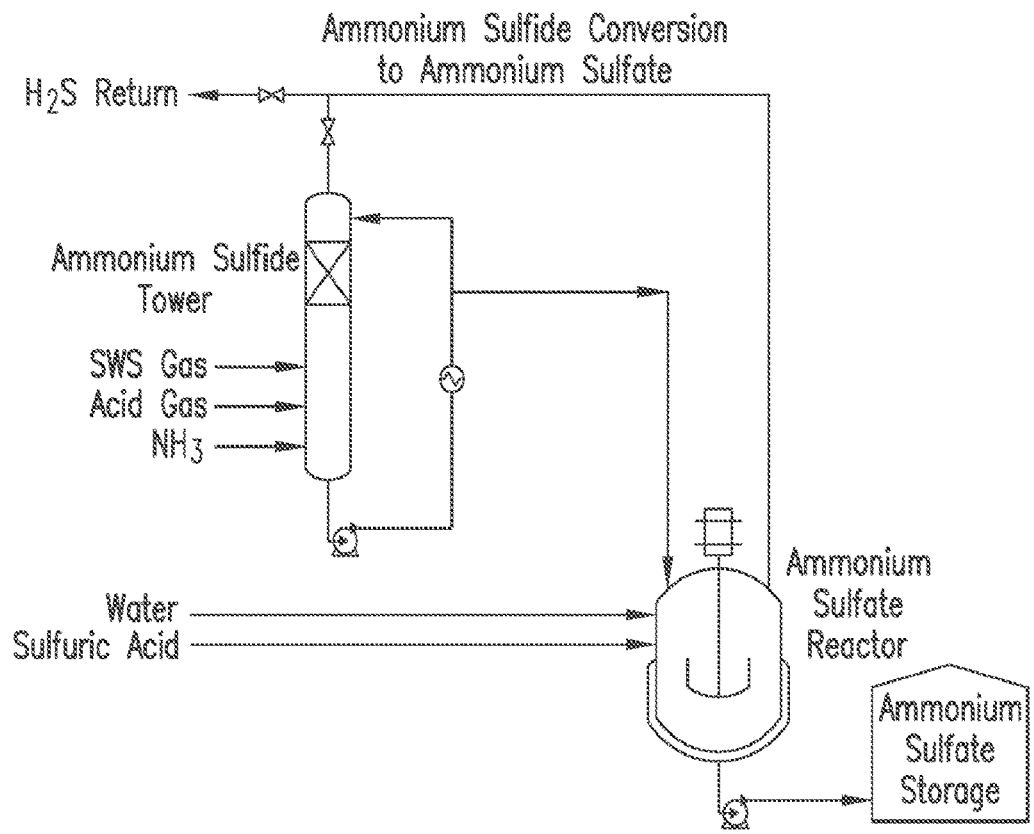
FIG. 1 is a schematic diagram of a process for conversion of ammonium sulfide solution (ASD) formed from sour water stripper gas (SWSG) and acid gas (AG), to a crude ammonium sulfate (AST) product using spent alkylation sulfuric acid or virgin sulfuric acid. This is a prior art process without further purification step to remove the refinery odor.

A first aspect of the invention concerns an aqueous composition comprising at least one oxidizable sulfur-based compound, for example, a sulfur-based salt (SBS) prepared from a gas stream that was obtained from a petroleum refinery process or a coke oven and that contains at least about 4 mol %, more specifically at least about 15 mol %, $H_2S$, $SO_2$ and/or $NH_3$. For example, in specific embodiments, the sulfur-based compound is prepared from a gas stream containing about 15 to 95 mol %, about 20 to 95 mol %, or about 30 to 95 mol %, $H_2S$, or $SO_2$ and/or $NH_3$. In more specific embodiments, the sulfur-based compound, more specifically, a sulfur-based salt, is prepared from a gas stream containing from about 15 to 95 mol %, about 20 to 95 mol %, about 30 to 95 mol %, about 30 to 85 mol %, or about 50 to 80 mol %, of $H_2S$.

The gas streams obtained from a petroleum refinery process or a coke oven as described are contaminated with at least about 0.1 mol % of contaminating refinery hydrocarbons, or, more specifically, about 0.1 to 15 mol % contaminating refinery hydrocarbons, with the upper limit typically being associated with a spike during a refinery upset. Typically, the gas streams obtained from a petroleum refinery process or a coke oven as described are contaminated with about 0.1 to 10 mol %, more specifically, about 0.1 to 8 mol % contaminating refinery hydrocarbons.

The contaminating refinery hydrocarbons are a complex mixture of compounds such as monocyclic aromatics (for example, one or more of alkyl benzenes, alkenyl benzenes, alkynyl benzenes, aryl benzenes, aryl halides, phenols, thiophenols, anilines, aryl carboxylic acids, aryl carboxylic acid esters, aryl carboxylic acid amides, aryl sulfones, aryl sulfonates, and aryl phosphonates), and polycyclic aromatics, including bicyclic aromatics (for example, one or more of tetrahydronaphthalene, substituted tetrahydronaphthalenes, indane, and substituted 1H-indenes), fused polyaromatics (for example, one or more of naphthalene and substituted naphthalenes), and non-fused polyaromatics, and heteroaromatic variations of such compounds having one or more hetero atoms in the aromatic ring(s), including monoheteroaromatics (for example, one or more of pyridine, substituted pyridine, thiophene, substituted thiophene, furan, substituted furans, pyrrole, substituted pyrroles, pyridazines, pyrimidines, pyrazines, imidazoles, oxazoles, isooxazoles, thiazoles, isothiazoles and pyrazoles), bicyclic heteroaromatics (for example, one or more of tetrahydroquinolines, tetrahydroisoquinolines, tetrahydrocinnolines, tetrahydroquinazolines and tetrahydroquinoxalines), bicyclic polyheteroaromatics (for example, one or more of quinolines, isoquinolines, cinnolines, quinazolines and quinoxalines, indoles, benzofurans, benzothiofurans, indazoles, benzoimidazoles, benzooxazoles, benzoisooxazoles, benzothiaazoles, and benzoisothiazoles), as well as alicyclic compounds with no, one or multiple heteroatoms in the ring(s) (for example, one or more of cyclopentanes, tetrahydrofurans, tehrahydrothiophenes, pyrolidines, morpholines, piperazine, and hiamorpholines). Heteroatoms include O, N and S. The compounds may be substituted with one or more groups, examples of which include, but are not limited to, halo, alkyl, aryl, nitro, benzoyl, nitroso, thio and/or aldehyde groups. The exact composition of these odor-causing refinery hydrocarbon contaminants in such gas streams can change from time to time depending on the crude material which was processed to produce the gas stream. Importantly, however, the refinery hydrocarbon contaminants impart the distinctive and unpleasant refinery odor to products produced from such gas streams.

Often, the gas streams obtained from a petroleum refinery process or a coke oven contain at least about 0.5 mol %, or, more specifically, from about 0.5 to 8 mol %, about 0.5 to 7 mol %, about 0.5 to 3 mol %, or about 1 to 3 mol %, of the contaminating refinery hydrocarbons. As noted, such contaminating refinery hydrocarbons have a distinctive and unpleasant organic odor, known as refinery odor, and cause aqueous compositions of a sulfur-based compounds, including SBS, formed from the stream to exhibit the refinery odor and an undesirable brown color.

In specific embodiments, the oxidizable sulfur-based compound(s) are prepared from a gas stream containing about 20 to 95 mol %, or about 30 to 75 mol %, $H_2S$ and/or $SO_2$ and/or $NH_3$, and the gas stream contains from about 0.5 to 8 mol %, about 0.5 to 7 mol %, about 0.5 to 3 mol %, or about 1 to 3 mol %, of the contaminating refinery hydrocarbons.

Oxidizable sulfur-based compounds such as oxidizable sulfur-based salts can, for example, be prepared from (1) refinery off gases, (2) coke oven off gases, (3) spent sulfuric acid gases, (4) flue gases from a power plant, and/or (5) gasifier off gas. Most common are (1) refinery off gases and/or (2) coke oven off gases and/or (3) spent sulfuric acid gases. Accordingly, in specific embodiments, the aqueous compositions of the invention comprise one or more sulfur-based salts that are prepared from (1) refinery off gases, and/or from (2) coke oven off gases, and/or from (3) spent sulfuric acid gases, which contain at least about 15 mol % $H_2S$ and/or $SO_2$ and/or $NH_3$, or, more specifically, about 15 to 95 mol %, about 20 to 95 mol %, or about 30 to 95 mol %, $H_2S$ and/or $SO_2$ and/or $NH_3$ and are contaminated with at least about 0.1 mol % of refinery hydrocarbons, or, more specifically, about 0.1 to 8 mol % of refinery hydrocarbons. In more specific embodiments, the sulfur-based salt is prepared from (1) refinery off gases, and/or from (2) coke oven off gases, and/or from (3) spent sulfuric acid gases, which contain from about 15 to 95 mol %, about 20 to 95 mol %, about 30 to 95 mol %, about 30 to 85 mol %, or about 50 to 80 mol %, of $H_2S$ and are contaminated with at least about 0.1 mol % of contaminating refinery hydrocarbons, or, more specifically, about 0.1 to 8 mol %, about 0.3 to 7 mol %, about 0.5 to 3 mol %, or about 1 to 3 mol %, of the contaminating refinery hydrocarbons. Occasionally, however, these gases may contain up to about 15 mol % of contaminating refinery hydrocarbons owing to large hydrocarbon spikes during refinery upsets.

The oxidizable sulfur-based compound(s) contained in the aqueous compositions of the invention are typically selected from thiosulfates, sulfites, bisulfites, sulfides, hydrosulfides, thionates, polythionates, and mixtures of two or more thereof. The term "oxidizable sulfur-based compounds" also includes any other oxidizable derivative of sulfides, sulfites, hydrosulfides, and/or bisulfites, as well as mixtures of two or more of any of these. Preferred herein are thiosulfates and/or sulfides and/or hydrosulfides. In a specific embodiment, the aqueous compositions comprise saturated salt solutions. These salts typically contain ammonium or metal counter ion. Ammonium and metal sulfides can be converted into corresponding sulfates or thiosulfates, and sulfites and bisulfites can be converted into thiosulfates, as explained infra.

The term "metal" as used herein, in a broad sense, refers to alkali metals, alkali earth metals and/or transition metals such as zinc, iron, and copper. In specific embodiments, the sulfur-based salt(s) in the aqueous compositions of the invention have an ammonium ion, alkali ion, or alkali earth ion as counter-ion. In more specific embodiments, oxidizable ammonium salts, potassium salts, sodium salts, calcium salts, magnesium salts, or mixtures of two or more of these are employed in the aqueous compositions of the invention.

In more specific embodiments, the oxidizable sulfur-based salts are ammonium salts and/or potassium salts.

In a further embodiment of the invention, the oxidizable sulfur-based compounds comprise, consist essentially of, or consist of, at least one thiosulfate. Thiosulfates are typically provided in the market as solutions in water. In the invention, thiosulfate solutions are typically used at their maximum concentrations, i.e., in saturated solutions. The thiosulfate in the aqueous composition can be selected from ammonium thiosulfate, potassium thiosulfate, calcium thiosulfate, sodium thiosulfate, magnesium thiosulfate, manganese thiosulfate, iron thiosulfate, or mixtures of any two or more of these. In other specific embodiments, the thiosulfate in the aqueous composition is selected from ammonium thiosulfate, potassium thiosulfate, calcium thiosulfate, magnesium thiosulfate, manganese thiosulfate, iron thiosulfate, or mixtures of any two or more of these. In other specific embodiments, the thiosulfate in the aqueous composition is selected from ammonium thiosulfate, potassium thiosulfate, calcium thiosulfate, magnesium thiosulfate, or mixtures of any two or more of these. In more specific embodiments of the invention, the aqueous compositions comprise ammonium thiosulfate and/or potassium thiosulfate, the most used alkali salts, and/or calcium thiosulfate and/or magnesium thiosulfate, the most used alkali earth salts.

For example, currently on the fertilizer market are the following thiosulfate solutions (grade N-P-K):
Potassium thiosulfate, which is a ~50% aqueous solution (grade 0-0-25-17S).
Magnesium thiosulfate, which is a ~5-25% aqueous solution (grade 0-0-0-10S-4Mg)
Calcium thiosulfate, which is a ~5-25% aqueous solution (grade 0-0-0-10S-6Ca)
Ammonium thiosulfate, which is a ~50-60% aqueous solution (grade 12-0-0-26S).

In specific embodiments, sulfides include, but are not limited to, ammonium sulfide (ASD) and sodium hydrosulfide (or NaHS), while in additional embodiments, sulfites and bisulfites include, but are not limited to, ammonium bisulfite and potassium sulfite.

Conventional aqueous compositions of sulfur-based salts which are prepared from industrial gas streams as described herein, containing at least about 4 mol %, more specifically, at least about 15 mol % $H_2S$, $SO_2$, and/or $NH_3$ and at least 0.1 mol % contaminating refinery hydrocarbons, have a distinctive and unpleasant refinery odor. On the other hand, conventional aqueous compositions of sulfur-based salts prepared via a sulfur burner are typically refinery odor-free and do not contain any detectable refinery hydrocarbons. However, the sulfur burner method of production is not feasible in all situations. The present invention is therefore advantageous in providing aqueous compositions of oxidizable sulfur-based compounds from industrial waste gas streams, i.e., sour water stripping gas and/or acid gases and/or double stripper gases, which compositions do not exhibit refinery odor despite having been prepared from such industrial waste gas streams and containing detectable refinery hydrocarbon constituents.

Gas streams rich in $H_2S$ are the predominant source of hydrocarbon contamination. Gases rich in $SO_2$ that would be contaminated with refinery hydrocarbons through an improperly operating Claus unit or other contamination of a Claus unit, are another source of contamination. $SO_2$ gas is, for example, used for the conversion of (bi)sulfites into thiosulfates.

In an embodiment of the invention, refinery off gases containing hydrogen sulfide ($H_2S$), sour gases, are used in the preparation of aqueous compositions of oxidizable sulfur-based compounds according to the invention. Well known examples of sour gases are sour water stripper gas (SWSG) and/or acid gas (AG), as mentioned previously. Sour gases in general contain from about 0.1 to about 7 mol % of refinery hydrocarbons (RHC). Sour gases rich in $H_2S$ in general contain at least 15 mol %, more specifically at least about 25 mol %, or yet more specifically, at least about 30 mol % of $H_2S$.

More specifically, sour water stripping gas (SWSG) typically contains about ⅓ of ammonium gas ($NH_3$), about ⅓ of hydrogen sulfide gas ($H_2S$) and about ⅓ of water vapor ($H_2O$), plus some carbon dioxide ($CO_2$). The amount of contaminating refinery hydrocarbons in SWSG are typically up to about 7 mol % (relative to the total of the gas). Usually these gas streams contain from about 0.1 to about 7 mol % of refinery hydrocarbons. More typically this amount is around 3 mol %. In acid gas (AG), the amount of contaminating refinery hydrocarbons may be somewhat less, usually up to about 1 to 2 mol % (relative to the total of the gas). As these are descriptions of certain industrial gas streams for use in preparing an aqueous composition according to the invention, such gas streams are exemplary only and not limiting of the broader disclosure of various aspects of the invention.

In one embodiment, the refinery off gas comprises a source of ammonia ($NH_3$) that comes from refinery processes, specifically a "double stripper" for SWS gas which produces separate $H_2S$ and $NH_3$ streams. The ammonia stream has odor-causing hydrocarbons which can adversely affect any ammonia-based product such as ammonium sulfide, ammonium sulfite, ammonium bisulfite, and ammonium thiosulfate. The hydrocarbon levels are generally less than 200 ppm, but they are the very worst when it comes to odor, and typically include mercaptans and phenols In an additional specific embodiment of the invention, coke oven off gases are used in the preparation of oxidizable sulfur-based compounds of the invention. Coke oven gas is formed by heating coal to about 1100° C. without access of air. Delayed coker gas (light gas) that is almost all hydrocarbon with some small amounts of $H_2S$ is typically sent to an amine treating unit where the gas is separated into sweet fuel gas (methane, ethane, propane) and the acid gases $CO_2$ and $H_2S$. The "sour gas" from coke oven origin has some hydrocarbons associated with it; this sour gas is further referred to as "coke oven off gas". The amount of hydrocarbons in coke oven off gas often varies from about 0.1 to about 7 mol %, in general. As this is a description of a certain industrial gas stream for use in preparing an aqueous composition according to the invention, such gas stream is exemplary only and not limiting of the broader disclosure of various aspects of the invention.

In an additional specific embodiment of the invention, spent sulfuric acid gases are used in the preparation of oxidizable sulfur-based compounds of the invention, for instance for the conversion of a sulfide into a sulfite, bisulfite or thiosulfate. Spent sulfuric acid in general contains from 50-95% of sulfuric acid. The amount of refinery hydrocarbon in this gas stream most often is from about 3 mol % to about 9 mol %, more often from about 4 mol % to about 6 mol %. As these are descriptions of certain industrial gas streams for use in preparing an aqueous composition according to the invention, such gas streams are exemplary only and not limiting of the broader disclosure of various aspects of the invention.

From the above, it is evident that more than one of the gases as listed can be used in the preparation of an aqueous composition according to the invention, and that all give rise to a hydrocarbon contamination that affects odor and color. While processing and dilution, decantation and volatilization of the gas streams reduce the refinery hydrocarbon content, the amount of the refinery hydrocarbons remaining in the conventional final aqueous compositions prepared from such gas streams has not been low enough to avoid a lasting refinery odor and discoloring of the product.

In one embodiment, the aqueous compositions comprising at least one oxidizable sulfur-based compound according to the invention include a detectable amount of the contaminating refinery hydrocarbons from the gas stream, when analyzed as a concentrated extract by gas chromatography/mass spectrometry, but advantageously, the total amount of refinery hydrocarbons in said aqueous composition is below the olfactive detection limit, i.e., the aqueous composition is free of refinery odor. Within the present disclosure, "below the olfactive detection limit" and "free of refinery odor" mean that no refinery odor can be detected by a panel of trained olfactive experts. Importantly, the aqueous compositions exhibit no refinery odor when stored for at least 24 hours at room temperature and 60% relative humidity. An advantage of these compositions according to the invention is that the amount of the contaminating refinery hydrocarbons is low enough to avoid return of the refinery odor to the compositions over time, i.e., upon storage. In further embodiments, the aqueous compositions of the invention are free of the refinery odor even after storage for about 36 hours, about 48 hours, about 1 week, about 2 weeks, about 1 month, or even about 2 months at room temperature and 60% relative humidity.

The refinery odor-free property of the claimed aqueous compositions is surprising in view of the waste gas streams from which the compositions are produced. As noted, the aqueous compositions contain contaminating refinery hydrocarbons as remnants from the gas streams, when analyzed via a concentrated extract by gas chromatography/mass spectrometry. More specifically, a concentrated methylene chloride extract of 200 ml of the aqueous composition of the invention includes a gas chromatography/mass spectrometry-detectable amount of at least 1 ppm of contaminating refinery hydrocarbons comprising one or more sulfur-containing, saturated heterocyclic or acyclic compounds having a boiling point of at least about 150° C. In a suitable procedure, 50 ml of methylene chloride is used and the extract is concentrated to 1 ml for gas chromatography/mass spectrometry (GC/MS) analysis. More specifically, 200 mL of the aqueous composition and 50 mL of methylene chloride are placed in a glass container with a stir bar and the mixture is vigorously stirred with occasional shaking for 4 hours. The resulting phases are separated in a separatory funnel, and the methylene chloride phase is dried over anhydrous magnesium or sodium sulfate, filtered and concentrated to 1 ml. The methylene chloride portion is analyzed by GC/MS.

Contaminating refinery hydrocarbons in the aqueous compositions of the invention comprise one or more sulfur-containing, saturated heterocyclic or acyclic compounds having a boiling point of at least about 150° C. For example, such contaminating refinery heterocyclic hydrocarbons are typically of one or more of the following formula:

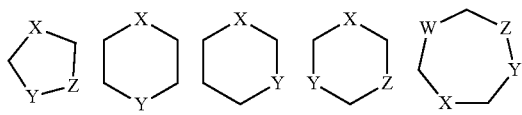

wherein at least one of W, X, Y and Z is sulfur and the others of W, X, Y and Z are carbon, nitrogen and/or oxygen. In more specific embodiments, the aqueous compositions of the invention comprise one or more sulfur-containing, saturated thiane compounds having a boiling point of at least about 200° C. For example, such contaminating refinery hydrocarbons are typically of one or more of the following formula:

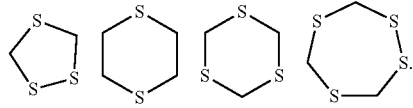

Aqueous compositions of oxidizable sulfur-based compounds prepared from reactants other than waste gas streams as described herein, for example, sulfur-based salts prepared via a sulfur burner, do not have any such contaminating refinery hydrocarbons.

In additional embodiments, the aqueous compositions comprising at least one oxidizable sulfur-based compound, prepared from a gas stream as described, contain contaminating refinery hydrocarbons in an amount which is significantly reduced as compared with conventional aqueous compositions comprising at least one sulfur-based salt prepared from a gas stream as described, but not treated to remove effectively remove odor-causing refinery hydrocarbons. For example, in certain embodiments, the aqueous compositions comprise less than about 40 mol % of contaminating refinery hydrocarbons as compared with conventional aqueous compositions comprising at least one oxidizable sulfur-based compound, or more specifically at least one oxidizable sulfur-based salt, prepared from a gas stream as described. In further embodiments, the aqueous compositions comprise less than about 50 mol %, 60 mol %, 70 mol %, 80 mol %, or 90 mol %, of contaminating refinery hydrocarbons as compared with conventional aqueous compositions comprising at least one oxidizable sulfur-based compound, or more specifically at least one oxidizable sulfur-based salt, prepared from a gas stream as described. In yet additional embodiments, the aqueous compositions comprise less than about 99 mol % of contaminating refinery hydrocarbons as compared with conventional aqueous compositions comprising at least one oxidizable sulfur-based compound, or more specifically at least one oxidizable sulfur-based salt, prepared from a gas stream as described.

Thus, the aqueous compositions of the invention contain a reduced amount of refinery hydrocarbons. While, as noted above, gas streams from which the sulfur-based salts are produced have varying refinery hydrocarbon contaminations, the compositions of the invention generally have significantly reduced content of (1) refinery naphthalene compounds, and/or (2) refinery phenolic compounds, as compared with compositions containing at least one oxidizable sulfur-based compound, or more specifically at least one oxidizable sulfur-based salt, prepared from the industrial gas streams and which are not subjected to the treatment steps as described herein. In certain embodiments, the aqueous compositions of the invention may still contain alicyclic compounds containing one or more sulfur atoms in a ring structure, for example, 5-, 6-, 7- or 8-membered rings, as discussed previously. The aqueous compositions generally differ from compositions in which the oxidizable sulfur-based compound, or more specifically the oxidizable sulfur-based salt, is prepared by sulfur burning in view of such detectable refinery hydrocarbons in the compositions of the invention, which are not present in those prepared by sulfur burning. Additionally, the amount of sulfur in the solution differs dependent on the type of bisulfite or thiosulfate produced.

In specific embodiments, the aqueous compositions of the invention are less colored than conventional compositions prepared from industrial streams as described herein, and are often transparent and colorless. In more specific embodiments, the aqueous compositions have an APHA color according to ASTM D-1209 of below 20, more specifically, below 15, or even more specifically, below 10. Conventional aqueous compositions prepared from industrial streams as described herein, without subsequent treatment, typically have an APHA color of about 50.

In accordance with specific embodiments of the invention, a refinery odor is removed from an aqueous stream of the oxidizable sulfur-based compound, or, more specifically, salt, prepared from an industrial gas stream as described by contacting the aqueous stream with at least one sorbent material. A "sorbent" material is a material that adsorbs or absorbs a certain substance or certain substances from a liquid or a gas. In this case, the sorbent adsorbs or absorbs hydrocarbons carried over from contaminated gas streams as described herein, specific examples of which are the refinery off gas streams (1), the coke oven off gas streams (2), the spent sulfuric acid gas streams (3), the flue gases from a power plant (4), and/or the gasifier off gases (5), as described, in the production of an aqueous composition comprising one or more oxidizable sulfur-based compounds, or, more specifically, sulfur-based salts. Adsorbents act by surface sorption while absorbents act by bulk sorption. It has been determined that the specific sorbent materials as disclosed provide an aqueous composition of an oxidizable sulfur-based compound, or more specifically, an oxidizable sulfur-based salt which, despite containing contaminating refinery hydrocarbons detectable by gas chromatography/mass spectroscopy, nonetheless contain the refinery hydrocarbons in an amount below the olfactive detection limit whereby the aqueous compositions of the invention are free of refinery odor. The sorbent material is stable in organic solvents, and/or strong bases (pKa>12, for example, 4-10% solutions of sodium hydroxide or potassium hydroxide) and/or strong acids (for example, 4-10% solutions of sulfuric acid or hydrochloric acid). In one embodiment, the sorbent material is in the form of granules and, more particularly, spherical particles. In a more specific embodiment, the sorbent material is in the form of spherical particles with a crush strength greater than about 300 g/bead, more specifically, greater than about 400 g/bead. Crush strength is determined by taking a representative sample of at least about 20 beads from a given sample of sorbent beads, and determining the force, in grams, needed to fracture each bead using a Chatillon Scale, Model DPP-IKG, available from J. Chatillon & Sons Company. Crush strength is reported as the average of the force measurements obtained for the 20 beads.

In specific embodiments, the sorbent material is selected from (a) a macroporous hydrophobic nonfunctionalized resin having a BET surface area ranging from about 500 to about 1,500 m²/g and a total porosity of greater than about 0.9 mL/g, and (b) granular activated carbon and glass fibers having a diameter ranging from about 0.001 to about 0.1 mm. In the resulting aqueous compositions, the levels of the claimed hydrocarbons advantageously stay and remain below the olfactory detection limit whereby the aqueous compositions are free of refinery odor. For example, in specific embodiments, the compositions are free of refinery odor after at least 24 hours of storage at room temperature and 60% relative humidity. An advantage of these compositions according to the invention therefore is that the amount of the contaminating refinery hydrocarbons is low enough to avoid return of the refinery odor to the compositions over time, i.e., upon storage. In further embodiments, the aqueous compositions of the invention are free of the refinery odor even after storage for about 36 hours, about 48 hours, about 1 week, about 2 weeks, about 1 month, or even about 2 months at room temperature and 60% relative humidity. The aqueous compositions generally have reduced content of (1) refinery naphthalene compounds, and (2) refinery phenolic compounds as compared with a similarly produced composition that has not been subjected to contact with the sorbent material.

The macroporous hydrophobic resin sorbent is nonfunctionalized, i.e., it does not have ion exchange properties. The combination of macroporosity and total porosity of greater than about 0.9 mL/g, providing a BET surface area ranging from about 500 to about 1,500 m²/g in the resin is advantageous for removing the refinery odor-causing contaminating hydrocarbons. The BET surface area is measured according to the well-known BET nitrogen adsorption technique (see, for example, Sing, *Colloids and Surfaces A: Physicochem. Eng. Aspects,* 187-188: 3-9 (2001)). The term "macroporous" refers in general to porous polymers having regions of densely packed polymer chains separated by cellular void spaces that constitute the macropores. The macropores generally have diameters of about 100 Å or greater, for example, in a range of about 100 to about 2000 Å. Of the total porosity, the amount contributed by macropores is, for example, from about 0.02 to about 0.6 cc/g, more specifically, from about 0.03 to about 0.5 cc/g. Suitable resins include, but are not limited to, those having a hydrophobic surface and containing aromatic groups. The resin sorbent attracts organic material and has a strong affinity for molecules with aromatic groups and/or alkyl chains. In a specific embodiment, the resin comprises a crosslinked vinyl resin, for example, a monovinylidine aromatic monomer, crosslinked with vinylaromatic such as divinylbenzene or trivinylbenzene, or acrylate vinylidene resins. More specific examples include, but are not limited to, crosslinked polystyrene resins or crosslinked substituted polystyrene resins (alkylstyrenes, halostyrenes, haloalkylstyrenes), and/or crosslinked acrylic or methacrylic resins, and the like. Such resins are commercially available.

In a specific embodiment, an aqueous composition comprising one or more oxidizable sulfur-based compounds, or, more specifically, salts is prepared by contacting an aqueous stream containing the oxidizable sulfur-based compound(s) and refinery hydrocarbon contaminants as described herein, prepared from (1) refinery off gases, (2) coke oven off gases, and/or (3) spent sulfuric acid gases, with a macroporous hydrophobic nonfunctionalized resin having a BET surface area ranging from about 500 to about 1,500 m2/g and a total porosity of greater than about 0.9 mL/g. The refinery odor of the aqueous stream is removed to provide the aqueous composition of the invention. In specific embodiments, the aqueous compositions are free of refinery naphthalene compounds and refinery phenolic compounds, while including one or more cyclic compounds containing one or more sulfur atoms in the ring structure as a detectable refinery hydrocarbon contaminant.

In additional embodiments, the sorbent material comprises granular activated carbon and glass fibers having a diameter ranging from about 0.001 to about 0.1 mm. In a more specific embodiment, an aqueous composition comprising one or more oxidizable sulfur-based compounds, or, more specifically, salts, is prepared by contacting an aqueous stream containing the oxidizable sulfur-based compound(s) and refinery hydrocarbon contaminants as described herein, prepared from (1) refinery off gases, (2) coke oven off gases, and/or (3) spent sulfuric acid gases, with the granular activated carbon and the glass fibers. The aqueous stream may be first contacted with the activated carbon, followed by contact with the glass fibers, or alternatively, the aqueous stream may be first contacted with the glass fibers, followed by contact with the activated carbon, or the aqueous stream may be contacted with the activated carbon and glass fibers simultaneously, i.e. in a bed packed with both activated carbon and glass fibers. The refinery odor of the aqueous stream is removed to provide the aqueous composition of the invention. In specific embodiments, the aqueous compositions are free of refinery naphthalene compounds and refinery phenolic compounds, while including one or more cyclic compounds containing one or more sulfur atoms in the ring structure as a detectable refinery hydrocarbon contaminant.

In another specific embodiment, an aqueous composition comprising one or more thiosulfate salts is prepared by contacting an aqueous stream containing the thiosulfate salt(s) and refinery hydrocarbon contaminants as described herein, prepared from (1) refinery off gases, (2) coke oven off gases, and/or (3) spent sulfuric acid gases, with granular activated carbon. The aqueous stream is contacted with glass fibers as described, prior to, simultaneous with, or subsequent to the contact with the activated carbon. The refinery odor of the aqueous stream is removed to provide the aqueous composition of the invention. In specific embodiments, the thiosulfate may be ammonium thiosulfate, potassium thiosulfate, magnesium thiosulfate, sodium thiosulfate, or calcium thiosulfate, or a combination of two or more of these thiosulfates. In specific embodiments, the aqueous compositions are free of refinery organic compounds, in particular free of refinery hydrocarbons, more in particular free of refinery phenolic compounds.

In another embodiment, the aqueous compositions of the invention comprise at least one thiosulfate prepared from a gas stream, wherein the gas stream was obtained from a petroleum refinery process or a coke oven and contained at least about 15 mol % of hydrogen sulfide ($H_2S$) and/or sulfur dioxide ($SO_2$) and at least about 0.1 mol % of contaminating refinery hydrocarbons, as described above. The composition has been passed through an activated carbon filter and glass fibers, wherein an extracted concentrate of the composition includes a detectable amount of contaminating refinery hydrocarbons when analyzed by gas chromatography/mass spectrometry. More specifically, a concentrated methylene chloride extract of 200 ml of the aqueous composition of at least one thiosulfate includes a gas chromatography/mass spectrometry-detectable amount of at least 1 ppm of contaminating refinery hydrocarbons comprising one or more sulfur-containing, saturated heterocyclic or acyclic compounds having a boiling point of at least about 150° C. Further, the total amount of refinery hydrocarbons in said aqueous composition is at least 40 mol % less than a comparable composition that has not been passed through the activated carbon filter, or more specifically, the activated carbon filter and glass fibers. In further embodiments, the aqueous compositions comprise less than about 50 mol %, about 60 mol %, about 70 mol %, about 80 mol %, or about 90 mol %, of contaminating refinery hydrocarbons as compared with a comparable composition that has not been passed through the activated carbon filter, or more specifically, the activated carbon filter and glass fibers. In yet additional embodiments, the aqueous compositions comprise less than about 99 mol % of contaminating refinery hydrocarbons as compared with a comparable composition that has not been passed through the activated carbon filter, or more specifically, the activated carbon filter and glass fibers. In more specific embodiments of these aqueous compositions, the thiosulfate comprises ammonium thiosulfate, potassium thiosulfate, sodium thiosulfate, calcium thiosulfate or magnesium thiosulfate, or a mixture of two or more thereof, or, more specifically, ammonium thiosulfate and/or potassium thiosulfate. In specific embodiments, the aqueous compositions are free of refinery organic compounds, in particular free of refinery hydrocarbons, more in particular free of refinery phenolic compounds.

The aqueous compositions of the invention have many end uses. In particular, the aqueous compositions are advantageous for use in agriculture as well as mining and industrial uses, including use as lixiviants for precious metals, water treatment, etc. Another aspect of the invention hence relates to agriculture products, including, but not limited to, fertilizers, or, more specifically, plant fertilizers, prepared from an aqueous composition of the invention. The plant fertilizer of the invention is, in a first embodiment, a liquid fertilizer, though it is possible to convert the aqueous composition into a solid product, for example, for use alone or with other solid fertilizers.

In additional embodiments, a fertilizer according to the invention comprises at least one additional nitrogen-, phosphorus-, or potassium-containing fertilizer compound (NPK fertilizer compound), which is different from the oxidizable sulfur-based compound in the aqueous composition of the invention. The at least one other NPK fertilizer often will be selected from nitrogen-containing fertilizers and/or from phosphorus-containing fertilizers. Suitable examples, include, but are not limited to, urea ammonium nitrate (UAN) and/or ammonium polyphosphate (APP). In additional embodiments, the fertilizer of the invention can also comprise one or more urease inhibitors and/or nitrification inhibitors that are different from the oxidizable sulfur-based compounds that are present in the aqueous composition. Examples of suitable inhibitors include, but are not limited to, N-(n-butyl) thiophosphoric triamide (NPBT) and/or dicyandiamide (DCD).

Another embodiment of the invention is directed to an aqueous composition for use in a mining or industrial application, comprising an aqueous composition of the invention, and in addition at least one other nitrogen-, sodium, calcium- or potassium-containing compound different from the at least one oxidizable sulfur-based compound in the aqueous composition of the invention.

The compositions of the present invention, in one embodiment, are in the form of liquid compositions, but, in another embodiment, the liquid composition is converted to solid or crystalline material, if desired. Another aspect of the invention hence relates to a solid or crystalline material prepared by drying an aqueous composition or a liquid fertilizer of the invention. This can, for instance, be achieved by any suitable process, including, but not limited to, freeze drying, fluidized bed dryers, spray dryers, evaporation, or eutectic freeze point separation.

Another aspect of the invention relates to the use of an aqueous composition, a liquid fertilizer, and/or a solid fertilizer as described, for agricultural purposes, i.e., by application to a plant. The aqueous compositions of the invention, or solid compositions prepared therefrom, are also suitable for use, for example, as a lixiviant in precious metal recovery, as a photographic chemical fixer solution, as a de-chlorination agent in municipal water treatment, and in remediation of contaminated soils. Other uses and methods of employing the aqueous compositions of the invention, or solid compositions prepared therefrom, will be apparent to those of ordinary skill in the art in view of the present disclosure.

The present invention is now further detailed in the following Examples, which are not intended to be limitative.

EXAMPLES

Example 1: From Tail Gas to a Crude Metal Sulfide Solution and Further Derivatives This example shows a process which uses a gas stream containing $H_2S$ and refinery hydrocarbon contaminants to produce ammonium sulfide, which is then used to produce ammonium thiosulfate. Sulfur-based salt solutions that are prepared from industrial waste gases and fluids (refinery sour gases) are often prepared via a crude sulfide solution. Sour water stripping gas (SWSG) and/or acid gas (AG) can be converted into a metal sulfide solution that can then be further transformed into a corresponding sulfate. Also, thiosulfates can be prepared from such metal sulfide solutions.

The reactions are shown below for the making of a crude ammonium sulfide solution, but in a similar way a potassium sulfide solution could be prepared. FIG. 1 shows a schematic of a suitable process. The sour water stripping gas typically contains about ⅓ of ammonium gas ($NH_3$), about ⅓ of hydrogen sulfide gas ($H_2S$) and about ⅓ of water vapor ($H_2O$). The amount of contaminating hydrocarbons in such a gas stream can be typically be up to about 5 mol % or more (based on the total of the gas). In sour water gas, the amount of contaminating hydrocarbons is somewhat less, typically up to about 1 to 3 mol % (based on the total of the gas).

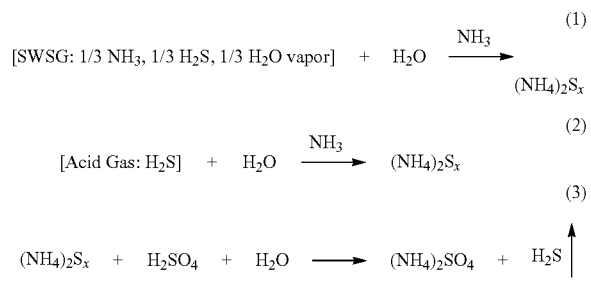

Reactions (1) and (2) involve conversion of sour water stripper gas (SWSG) and/or acid gas (AG) to an ammonium sulfide solution (ASD) using equipment that permits rapid, intimate contact of the gas and liquid reactants, for example, a static mixer, a vapor/liquid eductor, or an apparatus to bubble the gas through a liquid reservoir of solution that is agitated. Preferably, an absorption column is used because it provides the most efficient way to disengage the vapor from the liquid while providing good gas and liquid contact.

Reaction (3) shows how the crude ammonium sulfide intermediate is acidified with sulfuric acid, whether virgin or spent alkylation acid, in a first reactor at ambient conditions, or alternatively with moderate cooling, and with agitation to form an ammonium sulfate solution (AST).

Although reaction (3) illustrates a 1:1 mole ratio of ammonium sulfide (ASD) to sulfuric acid, an excess of sulfuric acid is normally used. Sulfuric acid could be fresh (virgin grade) sulfuric acid and/or spent alkylation sulfuric acid. Spent alkylation sulfuric acid contains 50-95% sulfuric acid along with various contaminations from the related process, usually hydrocarbons. Typically, the amount of hydrocarbons in spent sulfuric acid is up to about 6 mol % or more (based on the total of the gas).

Ammonium sulfide solutions generated from acid gas streams (AG) or sour water gas streams (SWGS) typically contain up to 5 mol % of organic impurities, generally hydrocarbons, from refining processes, natural gas, or coal-coking processes. This creates a typical refinery odor that will carry over to down-stream products prepared from this intermediate.

An ammonium sulfate solution obtained from this intermediate and a further reaction with sulfuric acid may be contaminated with hydrocarbons from either the sour water stripper gas (SWSG) and/or the acid gas (AG) and/or the spent alkylation sulfuric acid and requires further purification.

Though part of the odor generating species or molecules are removed through precipitation, decantation and dilution, the amount of organic compounds, typically refinery hydrocarbons, in the product streams of these described processes is sufficient to generating a distinctive and unpleasant refinery odor. For example, such product streams may contain from about 100 to about 1000 ppm, or more, or from about 100 to about 500 pm, or about 100 to about 300 ppm, of such refinery hydrocarbons. It is in particular the low molecular weight organic compounds, and more in particular the refinery hydrocarbons described previously, that remain in the product at concentrations above their odor detection thresholds.

Example 2: From Tail Gas to Thiosulfates Via a (Bi)Sulfite Intermediate

Figure 3:
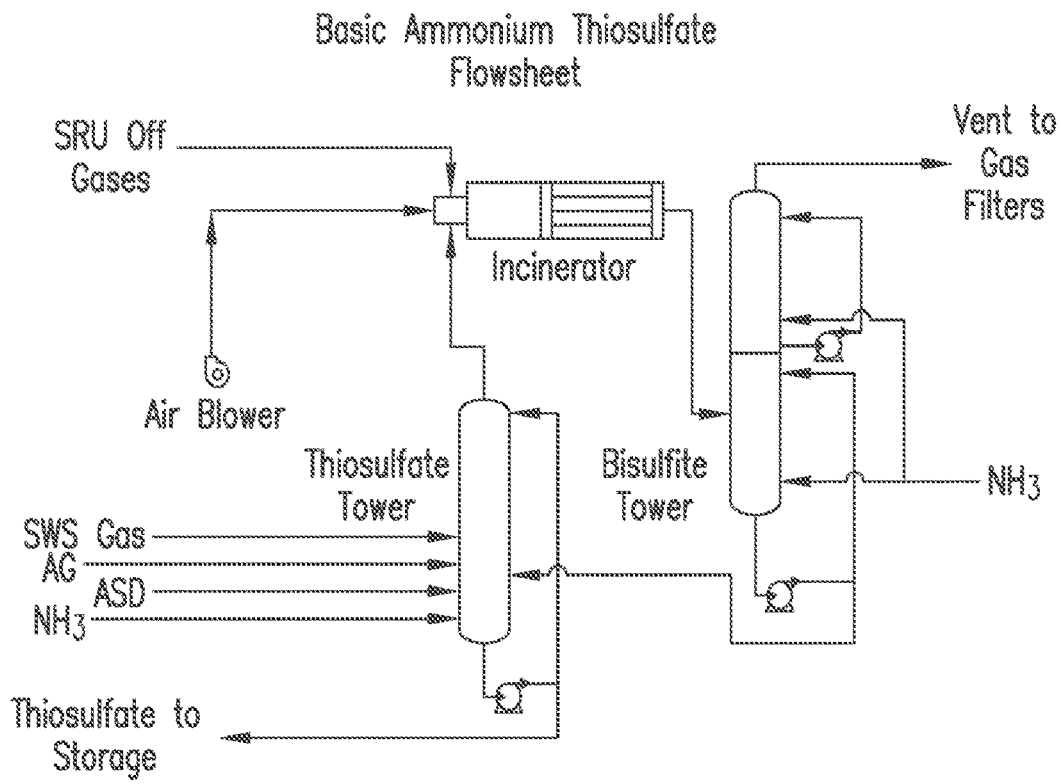
FIG. 3 is a schematic diagram of a process for conversion of $SO_2$ from acid gas (AG) into a crude ammonium sulfite/bisulfite (ABS) product, with a possible further step via addition of $H_2S$ from sour water stripper gas (SWSG) and/or acid gas (AG), to a crude ammonium thiosulfate (ATS) product. Removal of undesirable odor and color from the crude ammonium thiosulfate solution is accomplished by contact with a sorbent material as discussed in detail below.

This example shows a process which uses a gas stream containing $H_2S$ with refinery hydrocarbon contaminants to produce ammonium thiosulfate via a (bi)sulfite. Acid gas (AG) from a refinery as described above is sent to a Claus reactor where it is converted into elemental sulfur (S) and $SO_2$. Reactions (4), (5) and (6) involve conversion of $SO_2$ to an ammonium sulfite/bisulfite solution using equipment that permits rapid, intimate contact of the gas and liquid reactant. FIG. 3 shows the process schematically.

$$SO_2+2NH_3+H_2O \rightarrow (NH_4)_2SO_3 \quad (4)$$

$$(NH_4)_2SO_3+SO_2+H_2O \rightarrow 2(NH_4)HSO_3 \quad (5)$$

$$NH_3+SO_2+H_2O \rightarrow NH_4HSO_3 \quad (6)$$

In such a process, a 60 wt % sulfite/bisulfite solution can, for example, be made. This sulfite/bisulfite solution serves as an intermediate for making an ammonium thiosulfate via the reaction of a bisulfite with hydrogen sulfide ($H_2S$) and ammonia ($NH_3$), as shown in reaction (7), below. When $H_2S$ from SWSG and/or AG is used as the $H_2S$ source in reaction (7), refinery hydrocarbon impurities will also be present in the down-stream ammonium thiosulfate solution product. Similarly, in the event that an $SO_2$ stream contains refinery hydrocarbons, such may be present in the down-stream crude product.

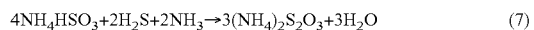

$$4NH_4HSO_3+2H_2S+2NH_3 \rightarrow 3(NH_4)_2S_2O_3+3H_2O \quad (7)$$

The aqueous composition of ammonium thiosulfate produced according to these reactions is provided as a ~60 wt % saturated solution. The amount of organic compounds, i.e., refinery hydrocarbons, is sufficient to generate an undesirable refinery odor and/or brownish color (for example, around 50 APHA) in the product. In specific embodiments, such refinery hydrocarbons are present in the crude ammonium thiosulfate solution in an amount of from about 100 to about 1000 ppm, or more, from about 100 to about 500 pm, or from about 100 to about 300 ppm.

Figure 4:
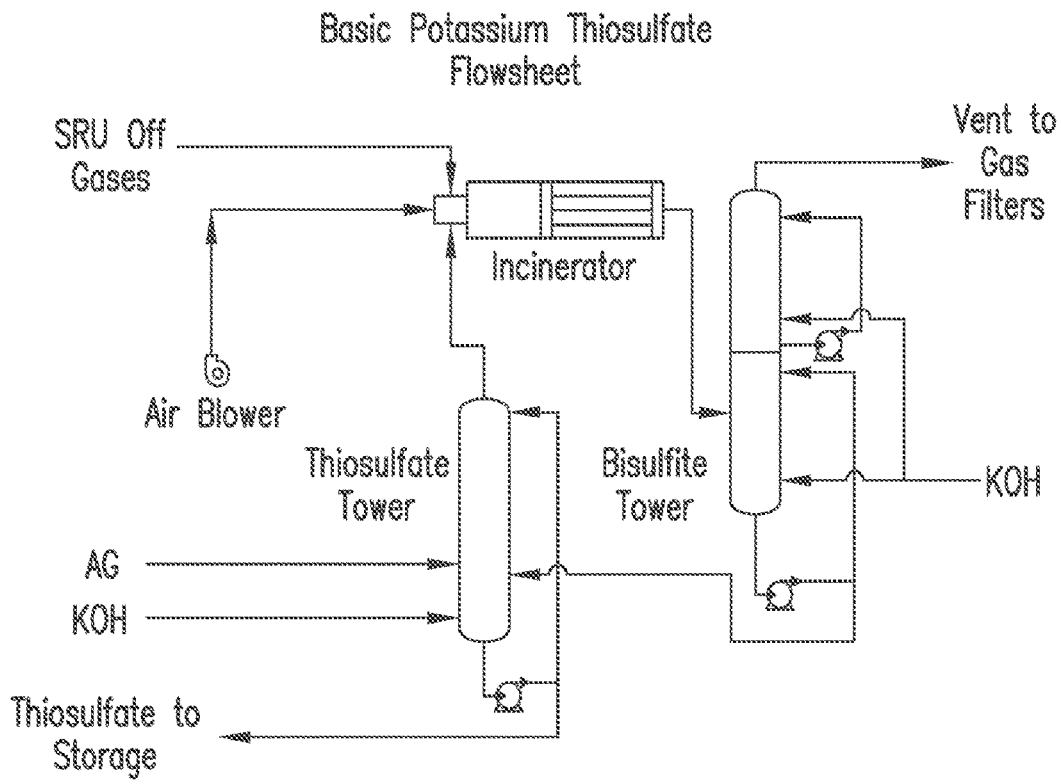
FIG. 4 is a schematic diagram of a process for conversion of $SO_2$ from acid gas (AG) into a crude potassium sulfite/bisulfite (KS/KBS) product, with a possible further step via addition of $H_2S$ from acid gas (AG), to a crude potassium thiosulfate (KTS) product. The construction and set up suitable to remove undesirable odor and color from the crude potassium thiosulfate solution are discussed below.

In a similar way, a potassium thiosulfate can be prepared from tail gas via the following reactions, via a (bi)sulfite as intermediate, using reaction (8), and as shown schematically in FIG. 4. This sulfite/bisulfite solution then serves as an intermediate for making a potassium thiosulfate via the reaction of a bisulfite with hydrogen sulfide ($H_2S$) from AG using reaction (9), and the present invention overcomes the problem of the refinery hydrocarbon impurities in the AG which lead to a typical refinery odor that is undesirable in agriculture products. Again, in the event that an $SO_2$ stream contains refinery hydrocarbons which are contained in the crude product, such are similarly removed in the products of the invention.

$$2SO_2 + 3KOH \rightarrow K_2SO_3 + KHSO_3 + H_2O \qquad (8)$$

$$2K_2SO_3 + 2KHSO_3 + 2H_2S \rightarrow 3K_2S_2O_3 + 3H_2O \qquad (9)$$

The potassium thiosulfate produced according to these reactions is provided as a ~50 wt % saturated solution that contains some carry-over hydrocarbon impurities. The amount of organic compounds, i.e., refinery hydrocarbons, is sufficient to generate an undesirable refinery odor and/or brownish color (for example, around 50 APHA) in the product. In specific embodiments, such refinery hydrocarbons are present in the crude potassium thiosulfate solution an amount of from about 100 to about 1000 ppm, or more, from about 100 to about 500 pm, or from about 100 to about 300 ppm.

Figure 2:
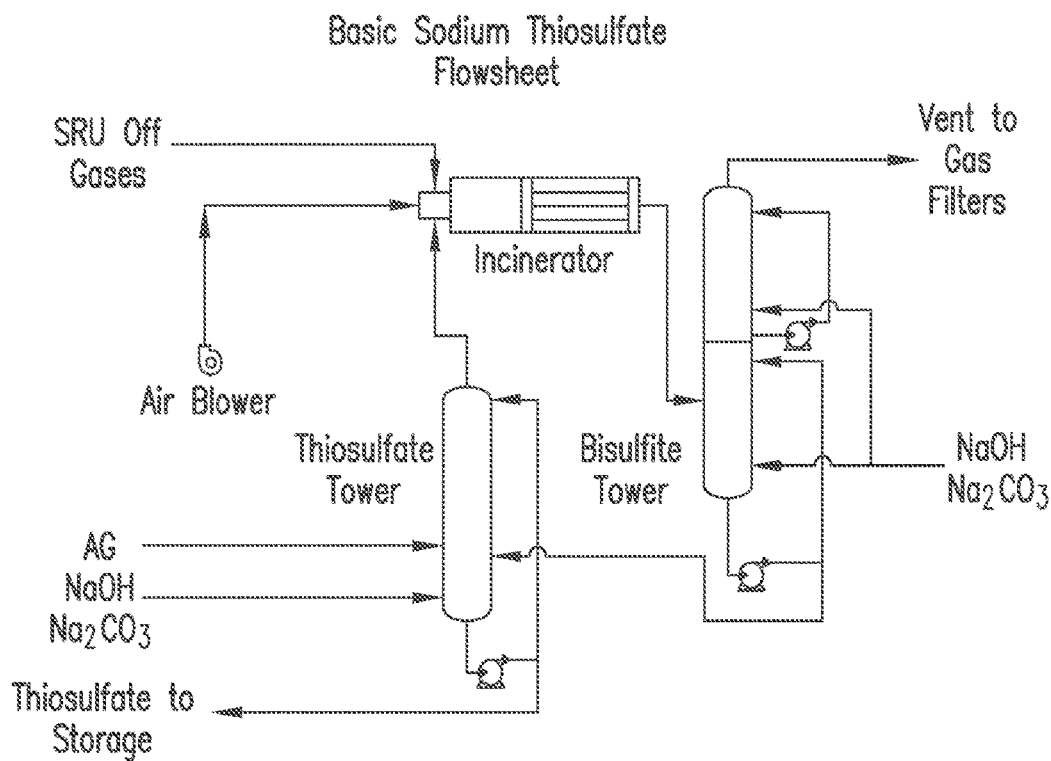
FIG. 2 is a schematic diagram for preparing sodium thiosulfate. The construction and set up suitable to remove undesirable odor and color from the crude sodium thiosulfate solution by contact with a sorbent material according to the invention are discussed below.

FIG. 2 shows a schematic process for producing sodium thiosulfate from a sulfur recovery unit off gas and acid gas, wherein the sodium thiosulfate product is free of refinery odor according to the present invention.

Example 3: From (Bi)Sulfite to Calcium and Magnesium Thiosulfate Solutions

Calcium and magnesium thiosulfate solutions typically are prepared from slurries that are further converted into a thiosulfate solution. For example, a magnesium thiosulfate solution can be formed as described below:

$$MgO + 2SO_2 + H_2O \rightarrow Mg(HSO_3)_2 \qquad (10)$$

$$Mg(HSO_3)_2 + 2S + MgO \rightarrow 2MgS_2O_3 + H_2O \qquad (11)$$

Reaction (10) involves synthesis of a $Mg(HSO_3)_2$ intermediate. The intermediate is a slurry, which typically includes a mixture of $Mg(HSO_3)_2/MgSO_3$ and $Mg(OH)_2/MgO$, in both solution and solid state. For convenience, the intermediate is referred to herein as $Mg(HSO_3)_2$ because this is the predominant species that has been measured in solution. Reaction (11) involves the utilization of this intermediate for preparation of a magnesium thiosulfate solution. As shown above, the stoichiometric reaction generates one mole of water for every two moles of magnesium thiosulfate generated.

To make a magnesium hydrosulfite slurry, magnesium oxide (MgO) and water are charged into a first reactor. The entire quantity of MgO for both of reactions (10) and (11) is usually introduced into the first reactor. Effective agitation should be applied throughout the reactions. $SO_2$ preferably is purged into the MgO slurry to adjust the pH, usually to about 2.5 to 6.5 and preferably to about 6.2-6.4. Because the purging process generates heat, external energy application generally is not necessary.

Reaction (11), involving the conversion of $Mg(HSO_3)_2$ into $MgS_2O_3$ occurs in a second reactor, which is charged with the $Mg(HSO_3)_2$ slurry synthesized in the first reactor. The second reactor is then charged with the prescribed quantity of S. The heat of reaction and some additional external heating bring the reaction solution to temperatures of about 97-100° C. (about 207-212° F.). The resulting crude magnesium thiosulfate solution has about 25 wt % of the thiosulfate. The making of a magnesium thiosulfate according to the above reaction scheme is described in detail in U.S. Pat. No. 6,921,523 B2.

The same applies for making a calcium thiosulfate solution from a calcium containing slurry according to one of the described pathways:

Using lime (calcium oxide, CaO) as calcium source:

$$CaO + S + SO_2 \rightarrow CaS_2O_3 \qquad (12)$$

Figure 5:
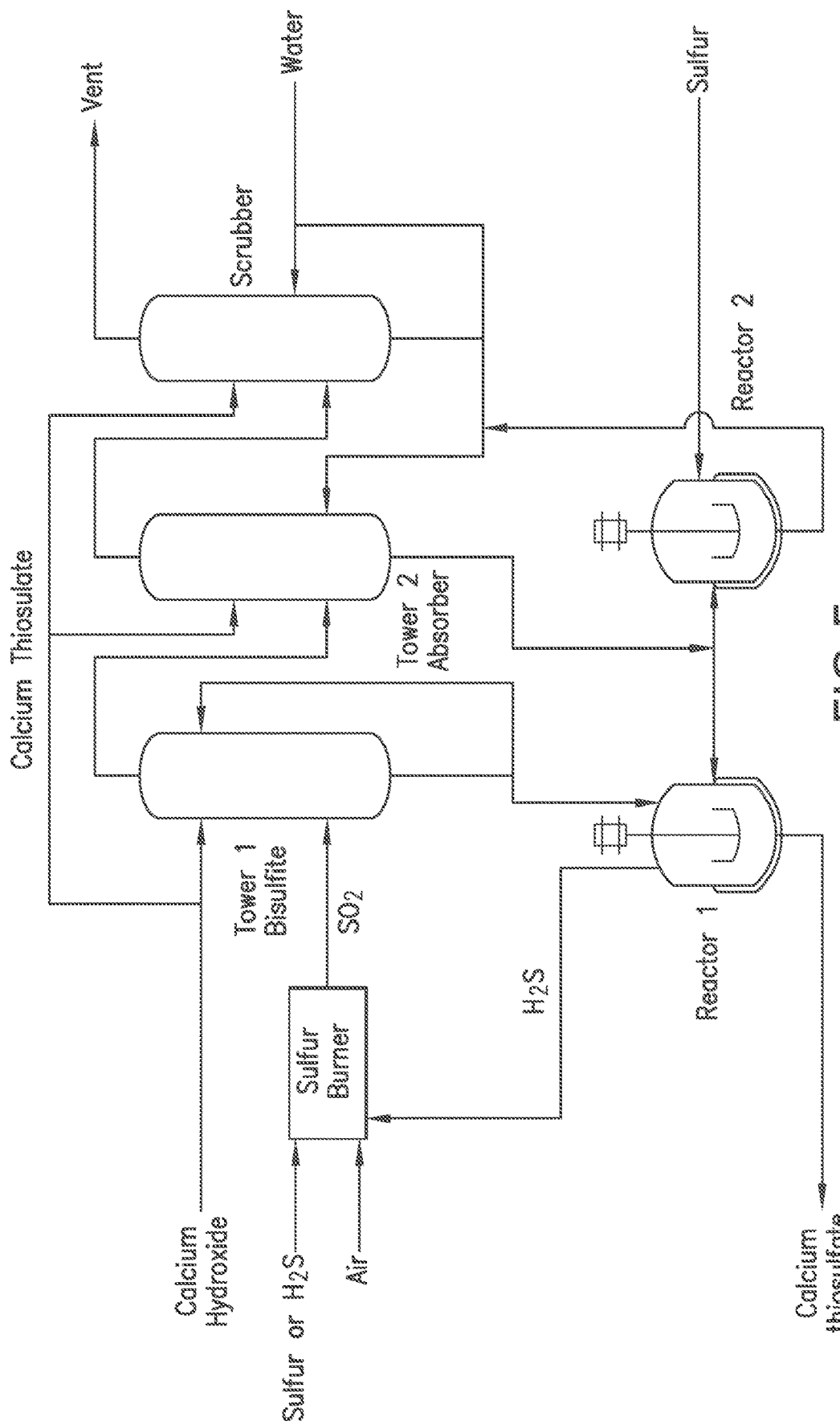
FIG. 5 is a schematic diagram of a process for making of a calcium thiosulfate from a (bi)sulfite solution, using a gas stream rich in $SO_2$. The construction and set up suitable to remove undesirable odor and color from the crude calcium thiosulfate solution are discussed below.

Using hydrated lime (calcium hydroxide, $Ca(OH)_2$) as calcium source, as shown in FIG. 5:

$$Ca(OH)_2 + S + SO_2 \rightarrow CaS_2O_3 + H_2O \qquad (13)$$

Using lime-sulfur (mixture of calcium polysulfides—$CaS_x$— and $CaS_2O_3$) as calcium source:

$$CaS_x + CaS_2O_3 + SO_2 + H_2O \rightarrow 2CaS_2O_3 + H_2S + (x-2)S \qquad (14)$$

Using calcium polysulfide ($CaS_x$) as calcium source:

$$CaS_x + SO_2 + H_2O \rightarrow CaS_2O_3 + H_2S + (x-2)S \qquad (15)$$

If either lime (CaO) or hydrated lime ($Ca(OH)_2$) is used as the calcium source, a slurry of the lime or hydrated lime in water is first provided, and then sulfur (S) is added to the slurry. Lime must be converted to hydrated lime by slaking, i.e. by mixing with water. Either a pre-existing slurry of hydrated lime is used, or a slurry is formed by mixing lime with water to form hydrated lime. In a preferred embodiment, the lime is about 96-99% pure. Preferably, the mixture of sulfur and the slurry is heated to at least about 70° C. (about 158° F.).

Sulfur dioxide ($SO_2$) is then added to the slurry which now contains calcium polysulfides as the reaction of calcium hydroxide and sulfur. Prior or the addition of sulfur dioxide, the calcium polysulfide reaction mixture slurry typically will require cooling (typically to about 55-75° C.), to avoid decomposition of the calcium thiosulfate formed and to avoid loss of sulfur dioxide due to evaporation or boiling off. Preferably, when the sulfur dioxide is added, the pH is adjusted to about 6-8.

The above is possible in a batch or semi-continuous process (see U.S. Pat. No. 6,984,368 B2 and U.S. Pat. No. 8,034,318 B2). The process steps for the batch production can be subdivided into three sections: lime slaking, reaction, and filtration (to filter off solids). The process steps for semi-continuous productions consist of repeatable cycles. Continuous processes for making a calcium thiosulfate solution, with possible use of $SO_2$ as oxidizing agent are described in U.S. Pat. No. 8,454,929 B2.

Example 4: Deodorizing and Decolorizing Crude Sulfur-Based Salt Solutions in a Single Step In this example, a crude ammonium thiosulfate with a typical refinery smell and brownish color was transformed into an end product aqueous composition in which the refinery odor was no longer present and the solution was transparent and colorless. The only odor remaining was a slight ammonia smell, typical, and commercially acceptable, for an ammonium thiosulfate product.

The same process can be used to produce odor-free and colorless aqueous compositions of other oxidizable sulfur-based salts, or, more generally, other oxidizable sulfur-based compounds, prepared from an industrial gas stream as described above. Compared to other more tedious procedures used in the art, the undesirable odor is removed in a single treatment step, without the risk of the odor returning, and the brownish color is removed.

Specifically, an aqueous ammonium thiosulfate solution that was made in a plant in the US from refinery off gases, having a distinct refinery odor and slightly brownish coloring, was passed through a packed resin bed containing a macroporous hydrophobic nonfunctionalized resin sorbent comprising crosslinked polystyrene having a BET surface area of about 1100 $m^2/g$ and a total porosity of about 1.16 mL/g in the form of spherical beads of about 0.3 to about 0.9 mm diameter (20-50 mesh).

Samples of the product before and after treatment were evaluated for olfactive property by a team of 3-5 different olfactive experts. Each expert evaluated three samples of the same batch, independently. Each time there were three repeat evaluations. After passing through the resin bed, the undesirable refinery odor was removed and only a slight ammonia odor, typical for an ammonium thiosulfate solution, remained. Advantageously, the refinery smell did not return within 24 hours or after extended storage, which is not the case with other conventional treatments as discussed below. The undesirable refinery odor was permanently removed.

Samples were also evaluated on color before and after treatment according to the APHA color measurement method which used a standard platinum cobalt reference solution with a color rating of 500 from RICCA Chemical. The standard was diluted to APHA color ranges from 100 to 10. The color of the crude and treated ammonium thiosulfate samples, respectively, were visually compared to the diluted standards. The APHA standard closest in color to each ammonium thiosulfate solution was assigned as the color value of the sample. The crude solution exhibited an APHA rating of 50, while the treated solution was transparent and colorless with an APHA rating of 10.

Aqueous ammonium thiosulfate solutions prepared in a European plant and contaminated with refinery-odor hydrocarbons were treated in the same manner. The resulting aqueous compositions were free of undesirable refinery odor while a slight amine odor, typical for an ammonium sulfate, remained. The compositions were transparent and colorless. The refinery odor did not return 24 hours after processing, or after extended storage. In contrast, passing the crude product solution through a packed bed which was filled with activated carbon produced an aqueous solution that was initially odor-free but the refinery odor returned shortly after processing (within 24 hours).

Example 5: Olfactory Evaluation and GC-MS Analysis

A comparison of the olfactive evaluation of aqueous compositions of the invention with olfactive evaluation of compositions processed by different treatments previously proposed in the art was conducted and shows various advantages of the compositions according to the invention. Sensory testing was done by an expert panel of eight persons trained in evaluating odor intensity and character.

Odor Scaling

1—No Refinery Odor

2—Very Slight Refinery Odor

3—Slight Refinery Odor

4—Medium Refinery Odor

5—Strong Refinery Odor

Several ammonium thiosulfate solutions prepared from a gas stream from a petroleum refinery process and having a strong refinery odor were mixed to provide a crude solution which had a Refinery Odor of 5. Respective samples of the crude solution were then subjected to the following treatments (A-D) and subjected to olfactive evaluation. Results obtained are summarized in Table 1.

A. A 250 mL of the sample of the crude solution was heated to 90° C. under reflux with constant nitrogen sparging in a 500 mL round bottom flask for four hours, cooled down, and olfactively evaluated for odor. The solution was then reheated to 90° C. and sparged with nitrogen for another four hours, cooled down, and again olfactively evaluated. The refinery odor was still at a level 5 at both the 4-hour and 8-hour time points.

B. Ten grams of activated carbon and 190 grams of crude solution were constantly mixed and heated to 80° C. for four hours without reflux. Upon cooling, the activated carbon was filtered from the solution. The refinery odor was rated a 2 on the odor scale. However, after sitting for 4 hours the strong refinery odor returned and was once again a 5 on the odor scale.

C. 200 grams of crude solution were mixed with 50 grams of activated carbon (Calgon CGR-22) and heated to 90° C. with mixing, nitrogen sparging, and reflux for 4 hours. After cooling, the sample was vacuum filtered. This sample still had some black carbon particles in the thiosulfate solution and had a refinery odor of 1. After 24 hours the refinery odor returned and was at an odor rating of 5.

D. A macroporous hydrophobic nonfunctionalized resin sorbent as described in Example 5 was placed into a 50 mL buret and the crude solution was passed through the sorbent at a flow rate of 0.2 mL/min. The first 15 mL was discarded as it was mostly water (the first bed volume displaces most of the water on the resin). 100 mL fractions were collected and evaluated olfactively. The first 5 fractions had an odor scale of 1 (no refinery odor). Additional samples of the thiosulfate solution were passed through the sorbent for a few weeks during normal laboratory working hours. A total of 5,000 mL was passed through the sorbent bed, equivalent to 250 bed volumes. These samples were allowed to sit for several months and the odor scale was still at a value of 1—no refinery odor in the samples.

TABLE 1

| | Olfactory evaluation x hours after treatment | | | | | |
|---|---|---|---|---|---|---|
| Treatment | Pre-treatment | 0 hours | 4 hours | 8 hours | 24 hours | Several months later |
| A: $N_2$ stripping | 5 | 5 | 5 | 5 | 5 | 5 |
| B: Activated carbon | 5 | 2 | 5 | 5 | 5 | 5 |

TABLE 1-continued

| | Olfactory evaluation x hours after treatment | | | | | |
|---|---|---|---|---|---|---|
| Treatment | Pre-treatment | 0 hours | 4 hours | 8 hours | 24 hours | Several months later |
| C: $N_2$ stripping + activated carbon | 5 | 1 | 3 | 5 | 5 | 5 |
| D: Example according to the invention | 5 | 1 | 1 | 1 | 1 | 1 |

This example shows that the aqueous compositions of the invention exhibit a significant advantage in being refinery odor-free for an extended period of time and, essentially, on a permanent basis. Results were excellent and consistent over time. The same results were obtained with aqueous thiosulfate samples from other plants, and with aqueous compositions of different sulfur salts as described herein.

Figure 6:
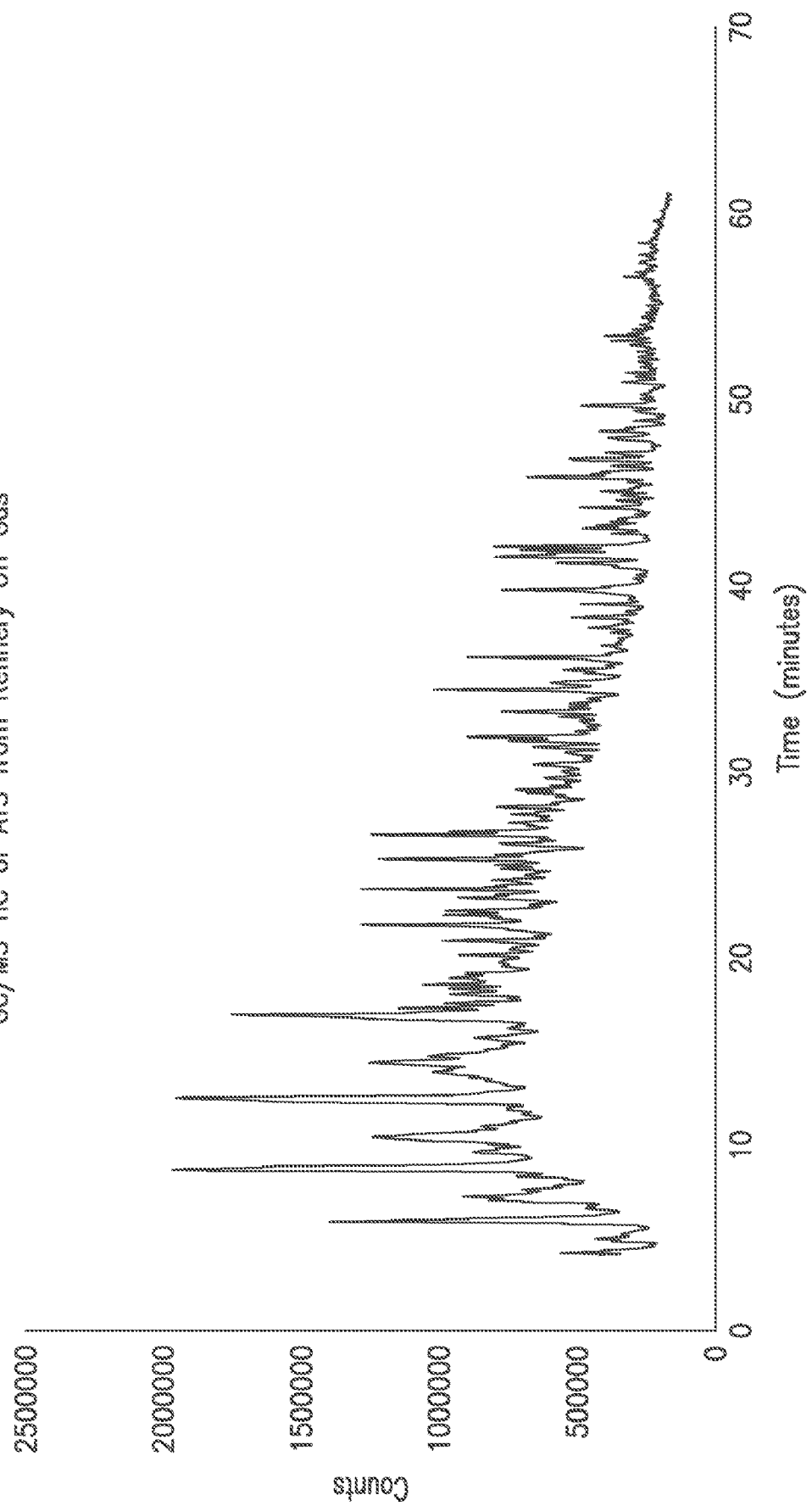
FIG. 6 is a gas chromatograph/mass spectrograph of a crude ammonium thiosulfate solution produced from a gas stream obtained from a petroleum refinery process.
Figure 7:
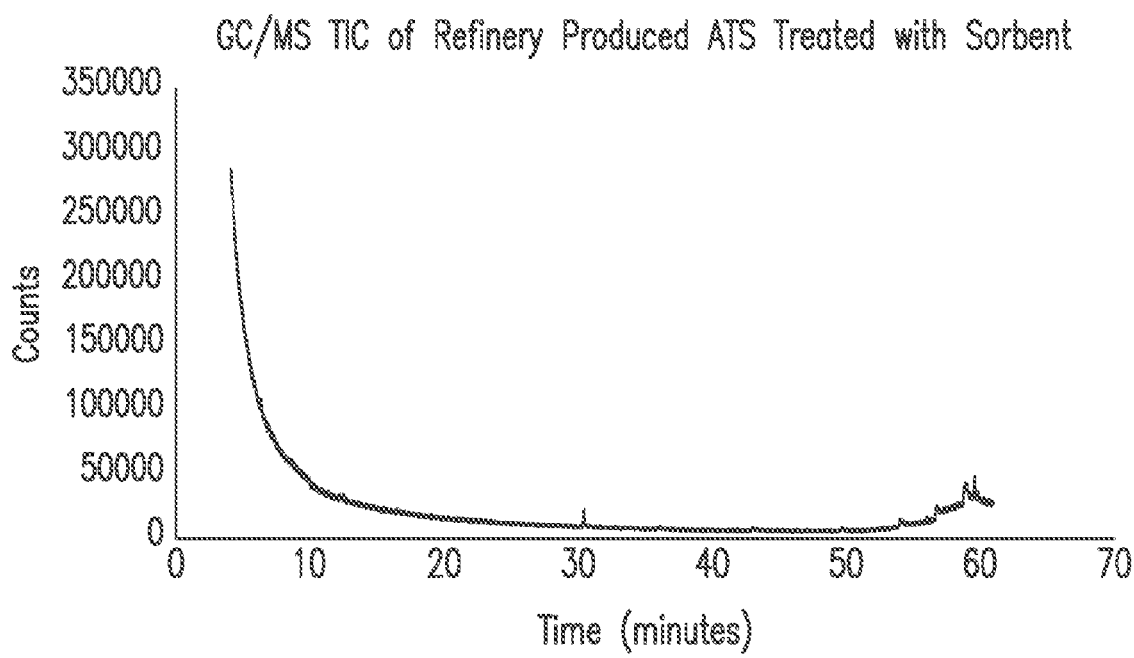
FIG. 7 is a gas chromatograph/mass spectrograph of an ammonium thiosulfate solution according to the invention and produced from a gas stream obtained from a petroleum refinery process.
Figure 8:
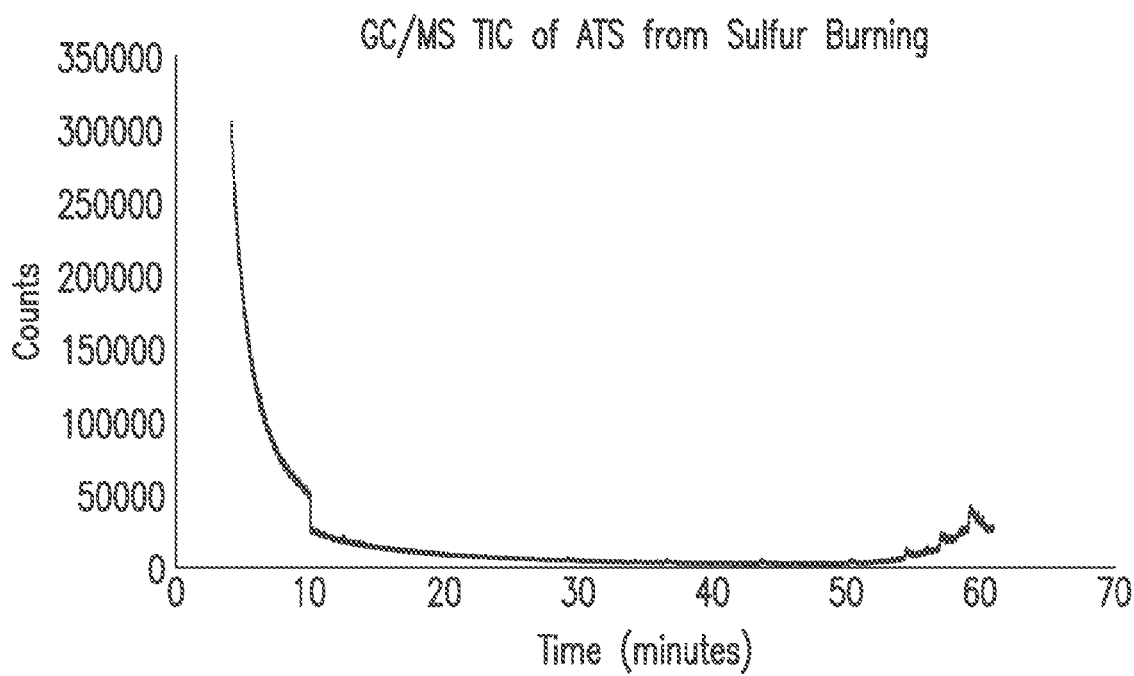
FIG. 8 is a gas chromatograph/mass spectrograph of an ammonium thiosulfate solution produced by sulfur burning.

Finally, samples of a crude ammonium thiosulfate solution and a solution according to the present invention, prepared with treatment D, were extracted with chloroform and hexane (two separate extractions per sample). The extracts were then run on gas chromatography/mass spectrometry, and the results are shown in FIGS. 6 and 7. FIG. 6 shows that the crude solution exhibiting significant refinery odor had a mixture of various refinery hydrocarbons as described above. On the other hand, FIG. 7 shows that numerous refinery hydrocarbons were removed from the solution according to the present invention, although the inventive solution still contained a detectable amount of refinery hydrocarbons. Finally, FIG. 8 shows the gas chromatography/mass spectrometry results for an ammonium thiosulfate solution that was prepared from sulfur burning, i.e., that was not prepared using a gas stream from a petroleum refinery process.

The GC/MS data of both extracts of the composition according to the invention showed an increasing level of the refinery hydrocarbons with increasing processing volume, most pronounced near the resin saturation point. Nevertheless, levels were very low and remained below the olfactory level until breakthrough point due to resin saturation. After breakpoint, the typical refinery odor remained in the samples because the refinery hydrocarbon removal capacity of the resin bed had been exceeded.

The untreated solution and two samples according to the invention were also analyzed for color. The color of the untreated sample was 50 APHA and the two treated samples according to the invention were at 10 APHA.

Example 6: Gas Chromatography/Olfactometry (GC/O)-MS

An aqueous ammonium thiosulfate composition according to the invention, prepared using treatment D as described in Example 6, and six additional thiosulfate solutions as described below were subjected to gas chromatography/olfactometry (GC/O)-MS evaluation. Eight panelists evaluated the odor and intensity of both original samples and extraction residues. Specifically, a liquid sample (100 ml) was extracted with 20 ml of redistilled dichloromethane in 250 ml separate funnel. The mixture was shaken vigorously for 5 minutes and held for phase separation. The upper layer was collected in a sample vial. The extraction procedure was repeated three times. The sample vial was frozen overnight and then filtered using 1 ps phase separator to remove water. One gram of anhydrous sodium sulfate was added into the vial. The dichloromethane was evaporated at room temperature and transferred to smaller vials and finally concentrated to 0.5 ml for GC analysis. An Agilent 6890 gas chromatograph equipped with an Agilent 5973 mass spectrometer (Agilent, Santa Clara, Calif., USA) was used for GC/O. Compounds were separated on a ZB-WAX column (30 m×0.25 mm i.d., 0.5 μm film thickness, Phenomenex Inc., Torrance, Calif.). The column flow rate was 2 mL/min with 1:1 split ratio to mass spectrometry and olfactometry. Initial oven temperature was 80° C. and held for 2 min, then increased to 180° C. at a rate of 2° C./min, and then ramped to 230° C. at a rate of 6° C./min with a 6 min hold at the final temperature. Injection port, MS transfer line, and ion source temperatures were 250° C., 280° C., and 230° C. respectively. Electron ionization mass spectrometric data were collected from m/z 40 to 250.

Three panelists performed the GC/O analysis, and each sample was analyzed twice. Odor quality and intensity were recorded. All of the GC/O data were combined, and only repeatedly recognized odor was recorded.

Ammonium thiosulfate samples as follows were evaluated:

| Sample | Treatment |
|---|---|
| 1 | Ammonium thiosulfate produced by sulfur burning |
| 2 | Crude ammonium thiosulfate produced using acid gas |
| 3 | Ammonium thiosulfate via treatment D |
| 4 | Ammonium thiosulfate filtered with activated carbon held in place with glass fibers |
| 5 | Ammonium thiosulfate treated with heat under reflux |
| 6 | Ammonium thiosulfate filtered with glass fibers |
| 7 | Ammonium thiosulfate filtered with activated carbon held in place with polymer screens |

The results of the GC and olfactory evaluations were as follows, with an odor intensity of 0 signifying no odor and an odor intensity of 5 signifying the strongest odor:

TABLE 2

| Sample | Original Odor | Odor Intensity | Residue Odor | Odor Intensity | Volatile Peak Area | Relative Peak Area | % Volatiles Removed |
|---|---|---|---|---|---|---|---|
| 1 | Ammonia | 0-1 | Petroleum, plastics | 0-1 | 80565576 | 100% | — |
| 2 | Tire, rubber, gasoline | 4-5 | Petroleum, smoky, harsh leather | 4-5 | 5887624075 | 7308% | — |
| 3 | Ammonia, fishy | 5 | Earthy, fishy | 0-2 | 79389286 | 99% | 99% |

TABLE 2-continued

| Sample | Original Odor | Odor Intensity | Residue Odor | Odor Intensity | Volatile Peak Area | Relative Peak Area | % Volatiles Removed |
|---|---|---|---|---|---|---|---|
| 4 | Smoking wood, gas, ammonia, petroleum | 2-3 | Petroleum, plastics | 0-1 | 70804681 | 88% | 99% |
| 5 | Smokey, new tire, medicinal, phenolics, burnt plastic, hospital | 4-4 | Sulfur, decay fish | 5 | 132500169 | 149% | 98% |
| 6 | Ammonia, weak rubber, plastic | 2-3 | Burnt rubber, autozone, hospital | 3-4 | 119724932 | 4966% | 32% |
| 7 | Garlic, sulfur, cabbage | 3-5 | Burned rubber | 3 | 4000957651 | 164% | 98% |

Sample 3 according to the invention did not exhibit any refinery odor and exhibited only a very slight odor of ammonia, expected for an ammonium thiosulfate solution, and was similar to the odor of Sample 1, the solution of ammonium thiosulfate prepared by sulfur burning. Sample 4, ammonium thiosulfate filtered with activated carbon held in place with glass fibers, exhibited significantly reduced odor as compared with the crude solution of Sample 2. The GC-MS analysis showed that a majority of the odorants in Sample 2 were naphthalene-related compounds and phenolic compounds. Additionally, the GC-MS analyses of the various products showed that Sample 3, with treatment D, and Sample 4, treatment with activated carbon and glass fibers/wool, removed both refinery naphthalene compounds and refinery phenolic compounds. Sample 6, treatment with glass wool removed the naphthalene compounds but not the phenol compounds, while Sample 7, treatment with activated carbon, removed the phenolic compounds but not the naphthalene compounds. Finally, Sample 5, treatment by sparging and heat caused degradation of the ammonium thiosulfate and resulted in cabbage, sulfur off odors in addition to the phenolic and naphthalene containing odorants.

Example 7: Ammonium Sulfide Solution

Ammonium sulfide (ASD) is a precursor to many products. In addition to the odors from ammonia and hydrogen sulfide, there are many other strong odors in the ASD which is prepared from a gas stream obtained from a petroleum refinery process or a coke oven. These odors are carried over into final products produced from the ASD. This example shows compositions according to the invention wherein the refinery odor is removed.

A crude ASD solution prepared from a gas stream obtained from a petroleum refinery process was run through a macroporous hydrophobic nonfunctionalized resin sorbent as described in Example 5. Twenty mL of the resin was slurry packed in a 50 mL buret. The ASD was then flowed through the resin at a flow rate of about 2 mL/minute. The first 20 mL of ASD was discarded so it would not dilute the product (the first bed volume displaces most of the water on the resin). Approximately 125 mL additional ASD was processed through the resin and collected and stored in a glass bottle.

A very careful olfactive evaluation of the resin-treated product and the crude ASD showed that the refinery odor in the treated product was removed. This is a surprising result in view of the strong refinery odor normally associated with ASD prepared from an industrial gas stream as described herein.

Figure 9:
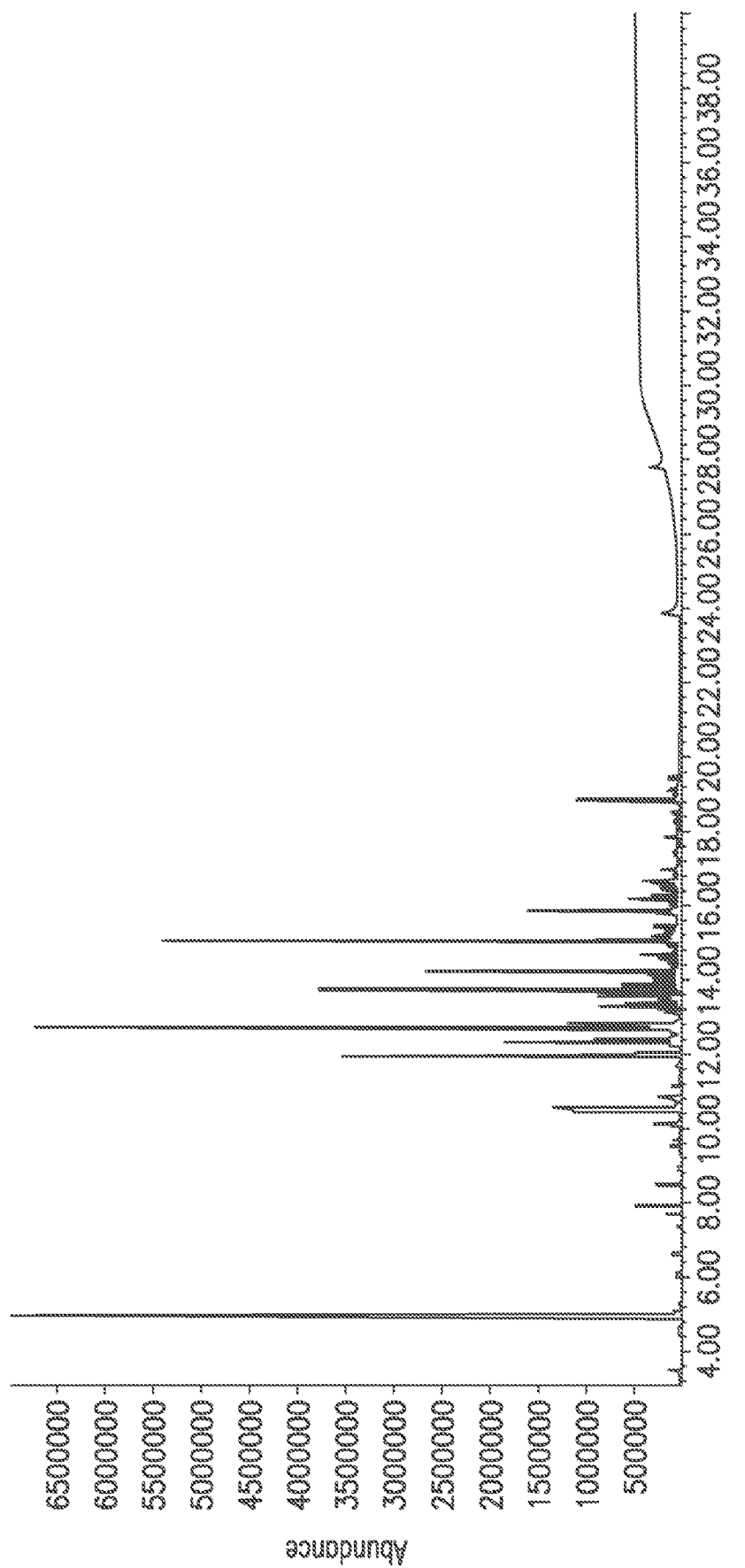
FIG. 9 is a gas chromatograph/mass spectrograph of a crude ammonium sulfide solution produced from a gas stream obtained from a petroleum refinery process.
Figure 10:
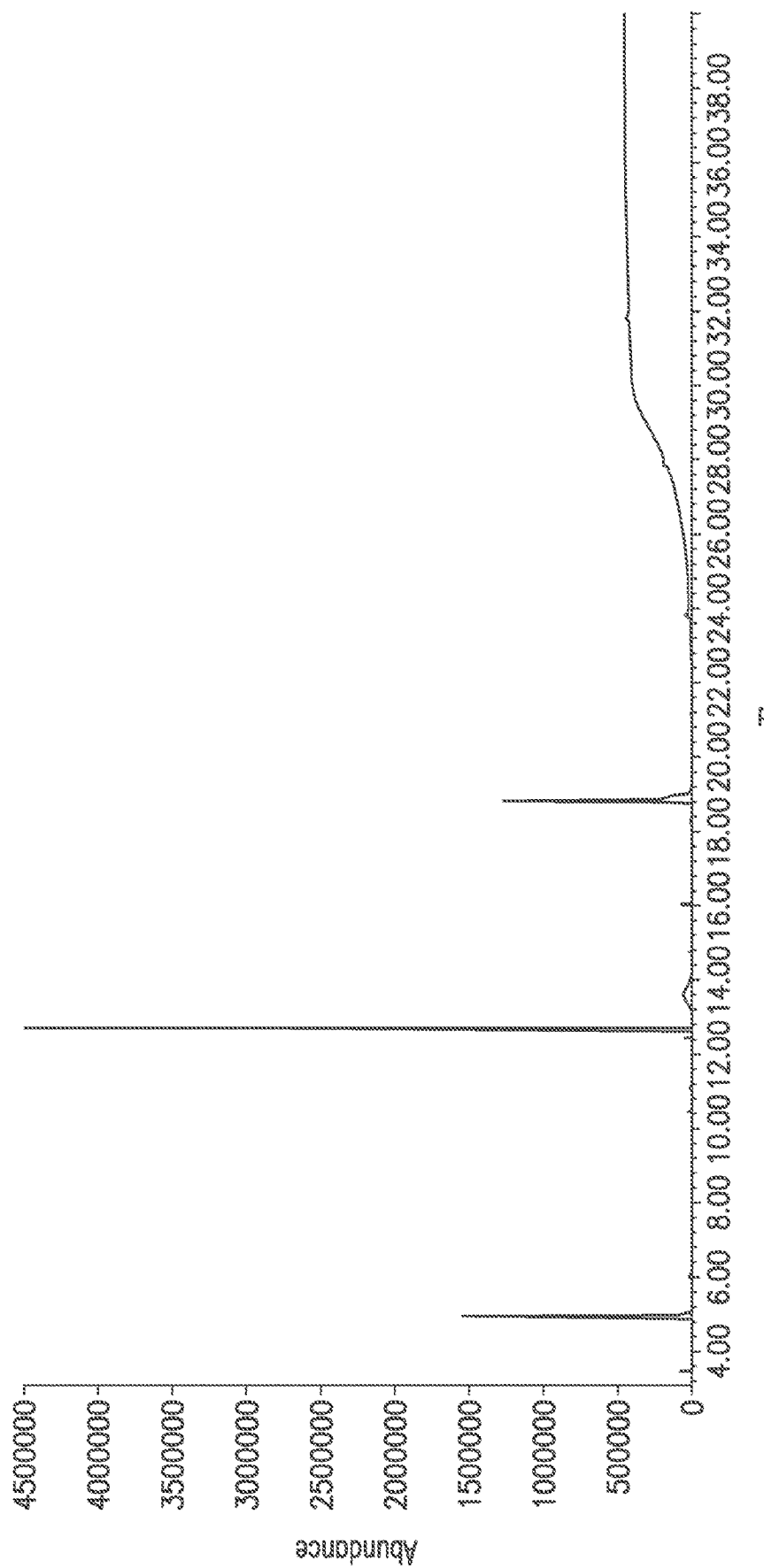
FIG. 10 is a gas chromatograph/mass spectrograph of an ammonium sulfide solution according to the invention and produced from a gas stream obtained from a petroleum refinery process.

Both the resin-treated ASD and the starting material were extracted with methylene chloride. For extraction, 200 mL of the sample and 50 mL of methylene chloride were placed in a glass jar. A stir bar was added to the jar and the mixture was vigorously stirred with occasional shaking for 4 hours. The phases were separated in a sepratory funnel, the methylene chloride phase dried over anhydrous magnesium or sodium sulfate, filtered and concentrated to 1 ml. The methylene chloride portion was analyzed by GC/MS. As can be seen in the chromatograms shown in FIGS. 9 (crude solution) and 10 (resin-treated solution), the resin removed most but not all of the refinery hydrocarbon type material. The peaks in FIG. 9 represent various refinery hydrocarbons, including, but not limited to analines, phenols, and mercaptans, and the peaks in FIG. 10 indicate the resin-treated solution contains a small amount of sulfur-containing hydrocarbons. The toluene peak (~5 min) is a carryover from the GC needle wash. The total peak area from each chromatogram was determined to estimate the relative amount of volatiles that were removed from the ASD was about 86%.

Example 8: Additional Thiosulfate Solutions

The improvements in ammonium thiosulfate solutions demonstrated in preceding examples are also obtained in other thiosulfate solutions.

Solutions of magnesium thiosulfate (MgTS), calcium thiosulfate (CaTS), and sodium thiosulfate (NaTS) were spiked with the oily layer from an ammonium sulfide sample. The oil was highly odorous and even produced odor when the glass storage bottle was tightly sealed. Three drops of the oil (approximately 0.04 g) were added to 500 mL of MgTS, CaTS, and NaTS solutions, respectively, in separate glass containers. The mixtures were well mixed for several hours. This resulted in a hydrocarbon concentration of approximately 80 ppm (w/v). The resulting refinery odor of the thiosulfate samples was very strong. They had a very strong mercaptan/petroleum odor. The oil was also not completely soluble with visible droplets and a visible sheen. A GC/MS analysis of this ASD oil showed that it contained hundreds of compounds including straight chain, branched and cyclic hydrocarbons, aromatics, substituted aromatics (benzenes and xylenes), aliphatic amines, indoles, carboxylic acids, and mercaptans.

Twenty mL of the macroporous hydrophobic nonfunctionalized resin sorbent as described in Example 5 was slurry packed into each of three separate burets. The samples were passed through the packed columns at approximately 1 mL/min. The first 20 mL of effluent (mostly water) was discarded and the next 150 mL was collected for olfactive analysis.

The initial samples before spiking were mostly odor free. No noticeable odor was detected in the MgTS and CaTS samples. The KTS sample had a slight refinery odor. After spiking with ASD oil and treatment with the resin, the samples were olfactively evaluated and compared to the pre-spike and spiked samples. The samples were evaluated by evaluators. Table 3 shows the results of the treated samples.

TABLE 3

| Sample | Odor Description | Relative Intensity* |
|---|---|---|
| MgTS | Little to No Refinery Odor | 3/100 |
| CaTS | Slight Refinery Odor | 5/100 |
| KTS | Slight Refinery Odor | 10/100 |

*The initial spiked samples were assigned an odor intensity of 100.

These results show compositions of various thiosulfate salts of the invention essentially free of refinery odor. It should be noted that the spiked samples employed in this example were likely higher in odor-causing refinery hydrocarbons than those typically encountered when using a gas stream in from a petroleum refinery process or coke oven in production of the thiosulfate solution.

The various examples and embodiments described herein are exemplary only and are not to be construed as limiting the scope of the invention defined by the following claims. Throughout this specification, when a range of conditions or a group of substances is defined with respect to a particular characteristic (e.g., temperature, pressure, amounts, and the like) of the present invention, the present invention relates to and explicitly incorporates every specific member and combination of subranges or subgroups therein. Any specified range or group is to be understood as a shorthand way of referring to every member of a range or group individually as well as every possible subrange and subgroup encompassed therein; and similarly, with respect to any subranges or subgroups therein.

The invention claimed is:

1. An aqueous compositions comprising at least one sulfur-based compound that is prepared from a gas stream containing at least about 4 mol % of hydrogen sulfide ($H_2S$), sulfur dioxide ($SO_2$), and/or ammonia ($NH_3$), and containing at least about 0.1 mol % of contaminating refinery hydrocarbons when analyzed by gas chromatography/mass spectrometry; but wherein the total amount of refinery hydrocarbons in the aqueous composition itself is below the olfactive detection limit after at least 24 hours of storage at room temperature and 60% relative humidity, and wherein a concentrated methylene chloride extract of 200 ml of the aqueous composition includes a gas chromatography/mass spectrometry-detectable amount of at least 1 ppm of contaminating refinery hydrocarbons comprising one or more sulfur-containing, saturated heterocyclic or acyclic compounds having a boiling point of at least about 150° C.

2. The aqueous composition of claim 1, wherein the at least one oxidizable sulfur-based compound comprises an oxidizable sulfur-based salt.

3. The aqueous composition of claim 1, wherein the at least one oxidizable sulfur-based compound is a thiosulfate, sulfite, bisulfite, sulfide, hydrosulfide, thionate, polythionate, sulfur dioxide, or a mixture of two or more thereof.

4. The aqueous composition of claim 3, wherein the at least one oxidizable sulfur-based compound is at least one thiosulfate, more specifically, ammonium thiosulfate, potassium thiosulfate, calcium thiosulfate, sodium thiosulfate, or magnesium thiosulfate, or a mixture of two or more thereof, or, more specifically, ammonium thiosulfate and/or potassium thiosulfate.

5. The aqueous composition of claim 3, wherein the at least one oxidizable sulfur-based compound is ammonium sulfide or ammonium hydrosulfide.

6. The aqueous composition of claim 1, wherein the detectable contaminating refinery hydrocarbons comprise one or more saturated cyclic thianes having a boiling point of at least about 200° C.

7. The aqueous composition of claim 1, wherein the composition has an APHA color according to ASTM D-1209 of below 20, below 15, or below 10.

* * * * *